United States Patent [19]

Matsumoto et al.

[11] Patent Number: 5,099,114
[45] Date of Patent: Mar. 24, 1992

[54] OPTICAL WAVELENGTH DEMULTIPLEXER

[75] Inventors: Takao Matsumoto, Yokohama; Masafumi Koga, Yokosuka, both of Japan

[73] Assignee: Nippon Telegraph & Telephone Corporation, Tokyo, Japan

[21] Appl. No.: 513,872

[22] Filed: Apr. 24, 1990

[30] Foreign Application Priority Data

Apr. 28, 1989 [JP] Japan .................................. 63-107721
Sep. 11, 1989 [JP] Japan .................................. 63-232762

[51] Int. Cl.$^5$ ............................. H01J 5/16; H01J 1/00
[52] U.S. Cl. ............................ 250/227.23; 250/226; 385/15; 359/124
[58] Field of Search .............. 250/226, 227.23, 227.27, 250/551; 350/96.15, 3.7; 370/3

[56] References Cited

U.S. PATENT DOCUMENTS

| | | | |
|---|---|---|---|
| 3,755,676 | 8/1973 | Kinsel | 370/1 |
| 3,761,716 | 9/1973 | Kapron et al. | 370/3 |
| 4,708,425 | 11/1987 | Gougli et al. | 370/3 |
| 4,745,591 | 5/1988 | Foley | 370/3 |
| 4,776,702 | 10/1988 | Yamaba | 356/425 |
| 4,783,591 | 11/1988 | Sullivan | 250/227.23 |
| 4,800,557 | 1/1989 | Weber | 370/3 |
| 4,816,672 | 3/1989 | Hughes | 250/227.23 |
| 4,835,381 | 5/1989 | Sorenson, III | 250/226 |
| 4,841,519 | 6/1989 | Nishio | 370/3 |
| 4,857,726 | 8/1989 | Kinney et al. | 250/227.23 |
| 4,904,088 | 2/1990 | Blazek et al. | 250/226 |

FOREIGN PATENT DOCUMENTS

| | | |
|---|---|---|
| 0013971 | 8/1980 | European Pat. Off. |
| 0197263 | 10/1986 | European Pat. Off. |
| 0213726 | 3/1987 | European Pat. Off. |
| 0222232 | 9/1988 | Japan .................. 250/227.23 |
| 2184158 | 6/1987 | United Kingdom. |

Primary Examiner—David C. Nelms
Assistant Examiner—Michael Messinger
Attorney, Agent, or Firm—Spencer & Frank

[57] ABSTRACT

An optical wavelength demultiplexer including an optical conversion device which converts a difference in wavelengths of a plurality of input signals into a difference in spatial power distribution of the input light signals, and a pattern recognition element for recognizing patterns of the spatial power distribution and taking out output signals. At the output portion of the optical conversion device, spatial power distributions are formed which are different for different wavelengths. After converting the spatial power distributions by the pattern recognition element into electrical signals, pattern recognition of the signals is performed to regenerate the original input signals with their respective wavelengths. The optical conversion device uses a diffractive grating or a combination of an optical multimode circuit, an optical multimode fiber, and a plurality of optical wavelengths. The pattern recognition element is constructed by a combination of a photo-detector array and a neural network, or a combination of a hologram element, a photo-detector array and a neural network.

11 Claims, 22 Drawing Sheets

A-1

A-2

(1, 0)

(0, 1)

(1, 1)

(0, 0)

$\Delta\lambda = 0$ nm $\Delta\lambda = 1$ nm $\Delta\lambda = 2$ nm $\Delta\lambda = 3$ nm (1,0)

(0,1)

(1,1)

(0,0)

OPTICAL WAVELENGTH DEMULTIPLEXER

BACKGROUND OF THE INVENTION

1. Field of the Invention

Optical communication technology includes wavelength multiplexing techniques which can transmit optical signals with a plurality of different wavelengths simultaneously and allot different information to different wavelengths in order to effectively utilize a transmission path. This type of technique needs optical receivers with a function which enables the separation of optical signals according to their wavelengths. The present invention relates to an optical receiver of this type. More particularly, the present invention relates to an optical receiver which has a function of separating multiplex optical signals according to their wavelengths when the spectrum of the wavelengths of the optical signals is narrow and stable.

2. Description of the Prior Art

FIG. 1 shows an example of a conventional optical receiver. As shown in FIG. 1, a wavelength-multiplexed signal beam 1 is scattered by an angle scatter element 3 after being transmitted through an optical fiber 2; and transmitted light rays are detected by respective photodetectors 4A to 4E which receive corresponding light rays scattered at respective scatter angles. In FIG. 1, reference numerals 5 and 6 indicate an incident side lens 5 and an outgoing side lens 6. As will be clear from the above-described configuration, the conventional optical receiver is a device constructed so as to detect differences in angles in terms of differences in position. Therefore, with the optical receiver, smaller differences in the scatter angle gives rise to a smaller difference in position, which makes the detection of such differences difficult. Generally, an allowance in the difference in position is small, e.g., as small as several tens of micrometers ($\mu$m), when the optical receiver is used to divide wavelength-multiplexed light with distances between adjacent wavelengths being on the order of 10 nm, and for this reason, a higher accuracy on the order of micrometers ($\mu$m) is required for the optical coupling of the angle scatter element 3 with the photodetector 4. This increases production costs of the device.

In addition, it is natural that the conventional optical receiver deteriorates its demultiplexing characteristics even with a slight fluctuation in the wavelength of the light source because it requires high precision on the order of micrometers in the optical coupling of the angle scatter element with the photodetector.

As will also be clear from the configuration shown in FIG. 1, the variation in wavelengths of the light source results in difference the in the scatter angle for the signal light, which requires alterations to be made in the design of the device. Therefore, the optical receiver lacks sufficient flexibility in its response toward changes in conditions such as fluctuation in wavelength.

As described above, the conventional optical receiver is disadvantageous in that it is uneconomical since its production cost is high and it has poor demultiplexing characteristics as well as it has poor flexibility towards various conditions upon measurement.

As another example of conventional optical receivers there is known a device which has a configuration as shown in FIG., 2. This type of optical receiver includes a combination of an optical receiver with an optical demultiplexer which realizes a Mach-Zehnder interferometer that has been well known in the field of classical optics using optical waveguides.

In FIG. 2, symbols 7A through 7F indicate single mode optical waveguides, 8A and 8B represent directional couplers, 9A through 9D are ports, and 10A and 10B are optical elements. The two directional couplers 8A and 8B are connected to each other via the two single mode optical waveguides 7A and 7B. The optical circuit shown in FIG. 2 has four ports 9A, 9B, 9C and 9D. The two single mode optical waveguides are different from each other in their length. Therefore, considering the case where optical signals are launched into the port 9A, the optical signals which have been separated via the directional coupler 8A and transmitted separately through the single mode optical waveguides 7A and 7B, respectively, are synthesized again in the directional coupler 8B, the optical signal which has been transmitted through the single mode optical waveguide 7A has a phase different from that of the optical signal which has been transmitted through the single mode optical waveguide 7B. The phase difference varies depending on the wavelength (or frequency) of the optical signals. The outputs from the ports 9C and 9D are determined depending on the phase difference.

FIG. 3 shows output characteristics obtained at the ports 9C and 9D, e.g., in the case where the separation ratio is 1:1 assuming that the wavelengths (or frequencies) of the two optical signals launched into the port 9A are $f_1$ and $f_2$, respectively. In this case, the optical output at the port 9C is high and that at the port 9D is low at the wavelength $f_1$ and on the contrary the optical output at the port 9C is low and that at the port 9D is high at the wavelength $f_2$. Utilizing these characteristics, the device can be used as an optical demultiplexer which allows signals $f_1$ and $f_2$ launched into the port 9A to branch out and be outputted from the ports 9C and 9D, respectively. Therefore, in the conventional optical receiver described above, in order to separate individual signals according to respective wavelengths from wavelength multiplexed optical signal, it has been so designed that photodetectors 10A and 10B are connected to the output ports 9C and 9D, respectively, so that electric signals OA and OB obtained from the respective photodetectors can be utilized as they are. That is, the electric signals OA and OB have been utilized as electric signals which correspond to optical signals with wavelengths (or frequencies) $f_1$ and $f_2$, respectively.

However, in the case where optical receivers are to be realized with the conventional configuration as shown in FIG. 2, subtle difference in the length and position of the optical waveguides gives a great influence on the wavelength separation characteristics of the devices since they utilize interference between the optical waveguides. For this reason, there has been required advanced techniques for designing and producing optical circuits, and if such techniques are employed the temperature of the optical circuits produced must be controlled with a precision of less than 1/10° C. and thus their characteristics tend to vary absent such temperature control. A further problem is that the configuration of the optical circuit becomes more complex when an increased number of wavelengths is to be used, which causes an increase in the scale of the circuit and deterioration of loss characteristics.

SUMMARY OF THE INVENTION

An object of the present invention is to provide an optical receiver which can separate a plurality of optical signals with different wavelengths in wavelength multiplexed optical communication where the optical signal light source has a narrow and stable wavelength spectrum, using an optical circuit which is simple and easy to fabricate.

To attain the above-described object, the present invention provides an optical receiver comprising two elements, i.e., an optical conversion device for converting differences in wavelength into a difference in spatial power distribution and pattern recognition means for recognizing the pattern of the spatial power distribution and taking out output signals.

The optical conversion device as the first element of the optical receiver of the present invention may be classified roughly into two groups, i.e., an optical multimode circuit and a diffraction grating. The optical multimode circuit group includes an optical multimode waveguide alone, an optical circuit composed of a optical multimode waveguide and a plurality of optical waveguides connected to an output terminal of the optical multimode waveguide, and an optical circuit composed of a combination of a pluralilty of optical waveguides, a directional coupler and Y-branch devices.

Therefore, specific examples of the optical conversion device as the first element of the optical receiver of the present invention includes the following four types of devices:

(i) an optical multimode waveguide alone;

(ii) an optical circuit composed of an optical multimode waveguide and a plurality of optical waveguides connected to an output terminal thereof;

(iii) an optical circuit composed of a combination of a plurality of optical waveguides, directional couplers and Y-branch devices; and (iv) a diffraction grating.

The term "optical waveguide" referred to herein also includes optical fibers.

Examples of the pattern recognition means as the second element of the optical receiver of the present invention include the following three types of devices:

(i) a configuration comprising a photo-detector array which receives optical signals corresponding to an optical power distribution from an optical conversion device and converts the signals into electric signals, and a neural network which comprises a plurality of processing elements and connection elements and processes the electric signals from the photo-detector array and takes out output signals that correspond to individual light signals with respective wavelengths contained in the multiplex or single wavelength light signals which are launched into the optical conversion device; (ii) a configuration comprising a hologram element which receives the optical signals launched from an optical conversion device, processes the optical signals according to their wavefront conditions and produces output light signals having optical power distributions which correspond to individual light signals with respective wavelengths contained in the multiplex or single wavelength light signals launched into the optical conversion device, and a photo-detector array which receives the output signals from the hologram element and converts the optical power distributions thereof into electric signals; and (iii) a configuration comprising the above-described hologram element, photo-detector array and neural network.

The neural network is preferably one with a self-learning function.

BRIEF DESCRIPTION OF THE DRAWINGS

FIGS. 4 through 11 explain a first embodiment of an optical receiver of the present invention, in which:

FIG. 4 is a schematic perspective view illustrating the configuration of the optical receiver according to the first embodiment of the present invention;

FIGS. 8A, 8B and 8C each are a graph showing experimental results illustrating the operation of an optical receiver according to the first embodiment of the present invention, in which;

FIG. 8A is a graph showing a transmission waveform pattern at an optical input portion;

FIG. 8B is a graph showing a waveform pattern at a photo-detector array;

FIG. 8C is a graph showing a waveform pattern of branched light at an output side of a neural network;

FIG. 9 is a schematic perspective view of the optical receiver according to the first embodiment of the present invention in which heterodyne detection mechanism is included;

FIG. 10 is a diagram showing an example of the neural network having a self learning function;

FIG. 11 is a timing chart showing the action of the neural network shown in FIG. 10;

FIGS. 14 through 17A, 17B, 17C and 17D each are to explain an optical receiver according to the fourth embodiment of the present invention, in which:

FIG. 14 is a schematic perspective view of the optical receiver according to the fourth embodiment of the present invention;

FIG. 15 is a schematic perspective view of a hologram element, illustrating a mechanism for memorizing patterns in the hologram element;

FIGS. 17A, 17B, 17C and 17D each are a diagram exemplifying an optical power distribution at a terminal surface of wavelength multiplexed optical signals of the output light from the optical multimode circuit used in the fourth embodiment of the present invention;

FIGS. 22 through 26 each are to explain the ninth embodiment of the present invention, in which:

FIG. 22 is a plan view of the configuration of an optical receiver according to the ninth embodiment of the present invention;

FIG. 23 is a graph showing the optical power distribution on a photo-detector array;

FIG. 24 is a graph showing the distribution of photocurrent when signal light with a wavelength $\lambda_1$ is received by the photo-detector array;

FIG. 25 is a graph showing the distribution of photocurrent when signal light with a wavelength $\lambda_2$ is received by the photo-detector array; and FIG. 26 is a graph showing the distribution of photocurrent when a signal light with a wavelength $\lambda_n$ is received by the photo-detector array.

DESCRIPTION OF THE PREFERRED EMBODIMENTS

The present invention will be described in detail with reference to attached drawings illustrating preferred embodiments which are shown by way of example and it should not be construed that the present invention is limited thereto.

FIRST EMBODIMENT

Figure 4:
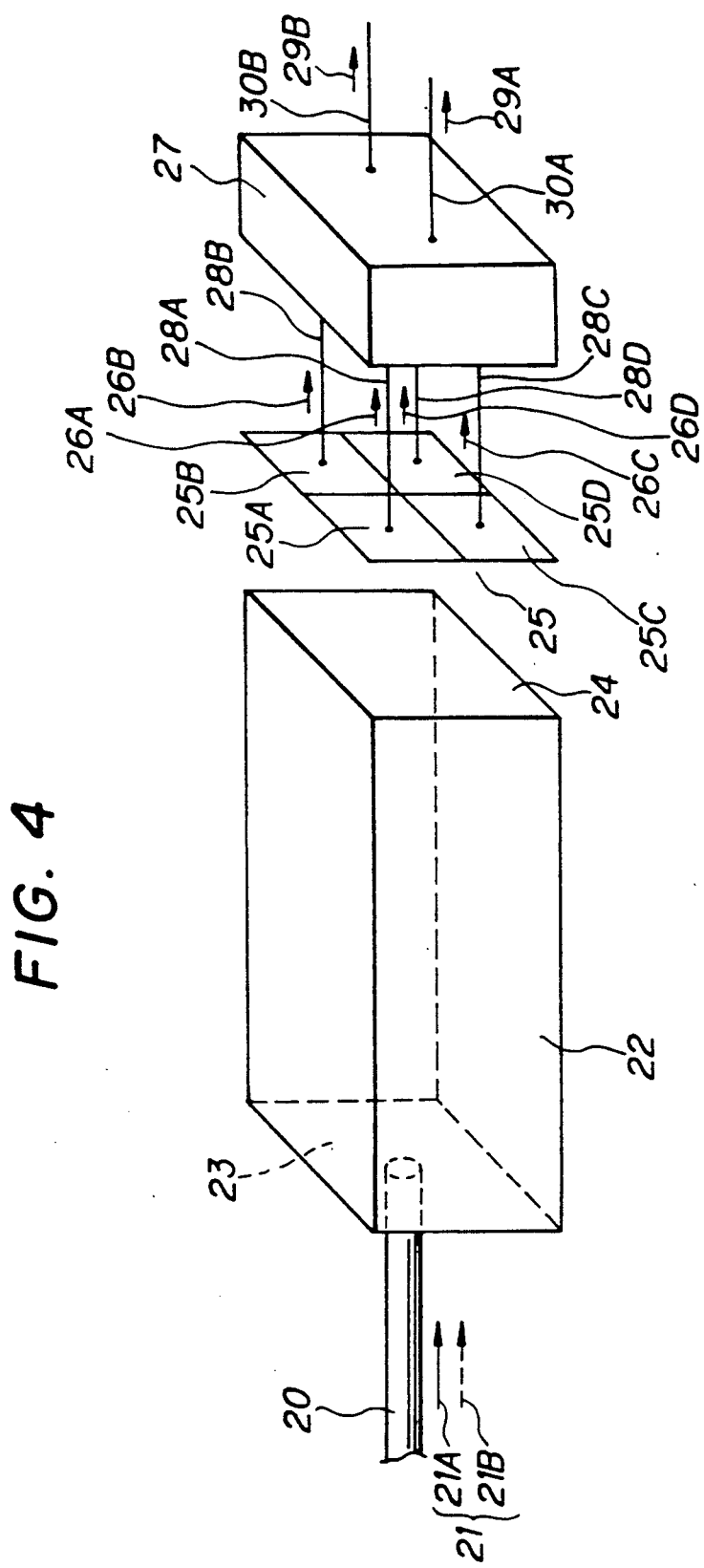

The first embodiment of the present invention is shown in FIG. 4, in which reference numeral 20 is an are optical input portion, 21A and 21B optical signals, 22 is an optical multimode circuit (herein, optical multimode waveguide alone), 23 is one terminal surface (input terminal surface) of the optical multimode circuit 22, 24 is the other terminal surface (output terminal surface) of the optical multimode circuit 22, 25A through 25D are photo-detector arrays, 26A throughout 26D represent electric signals, 27 is a neural network, 28A through 28D are input ports, 29A and 29B represent output signals, and 30A and 30B output ports.

As described above, this embodiment is characterized by a configuration in which the optical multimode circuit is connected to the photo-detector arrays and the neural network in order to separate individual signals contained in the respective optical signals with different wavelengths. Therefore, a definite difference between this embodiment and the prior art is in that the former uses an optical multimode circuit and a neural network. The term "neural network" as used herein refers to a signal processing network which comprises processing elements realized by an addition processor in which the weighted addition of signals from a plurality of input ports are performed and a non-linear processor in which input signals are processed non-linearly, and connection elements which combine the processing elements with each other, i.e., an optical circuit which has functions of recognition, association, learning and the like of input signals launched into the whole network. For this type of technology, reference is made, for example, to D. E. Rummerlhart, J. L. McElland and the PDP Research Group: "Parallel Distributed Processing", MIT Press, Cambridge (1986).

Next, explanation will be made on the operation of the optical receiver having the above-described configuration. The optical signal 21 launched into the optical input portion 20 contains optical signals 21A and 21B with wavelengths different from each other. After coming out of the wavelength of the input portion 20, the optical signals 21A and 21B propagate in the optical multimode circuit 22 and come out of terminal surface 24 thereof and enter the photo-detector array 25 in which they are combined. It should be noted that in the configuration shown in FIG. 4, the optical multimode circuit 22 is constructed by only an optical multimode waveguide alone. In the photo-detector array 25, the photodetectors 25A, 25B, 25C and 25D convert optical signals into electric signals 26A, 26B, 26C and 26D, respectively. The electric signals 26A, 26B, 26C and 26D enter the neural network 27 from the input ports 28A, 28B, 28C and 28D, respectively, and are processed therein. As the result, final output signals 29A and 29B are obtained from the output ports 30A and 30B.

In the embodiment of the configuration shown in FIG. 4, the optical power distribution of the optical multimode circuit 22 on its output side terminal surface varies depending on the differences in the wavelength of the optical signal 21. This is because a plurality of the modes which are propagated in the optical multimode circuit 22 have propagation constants different from each other in wavelength dependence and thus there naturally occurs wavelength dependence in the optical power distribution on the output side terminal surface 24 which appears as the result in interference among the respective modes. The optical power distribution of a type which appears on a terminal surface of an optical multimode circuit when light having a narrow spectrum is propagated in the optical multimode circuit is generally called a "speckle pattern" as described in R. E. Epworth: "Modal Noise—Causes and Cures", *Laser Focus*, pp. 109-115 (September 1981). Although the incident optical system on the input side terminal surface 23 of the optical multimode circuit 22 is stationary as shown in FIG. 4, differences in the wavelength of the optical signal 21 give rise to a different optical power distribution on the output side terminal surface 24.

Figure 5A:
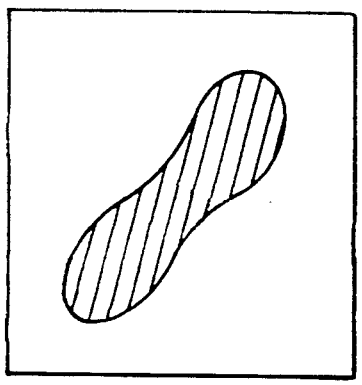
FIGS. 5A and 5B each are a first diagram showing an example of an optical power distribution in an optical multimode circuit for explaining the first embodiment of the present invention.
Figure 5B:
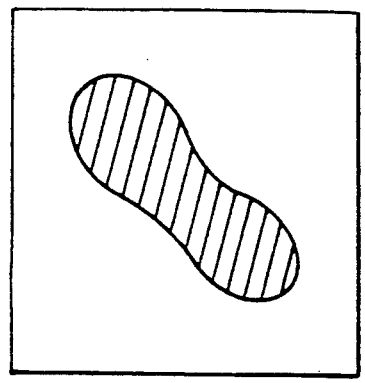
Figure 6A:
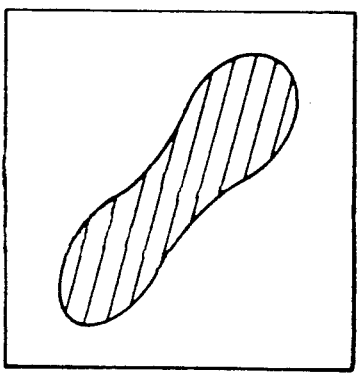
FIGS. 6A, 6B, 6C and 6D each are a second diagram showning another example of an optical power distribution in an optical multimode circuit for explaining the first embodiment of the present invention.
Figure 6B:
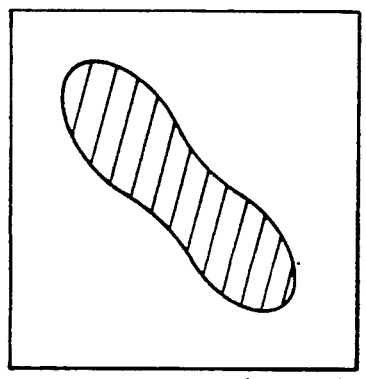
Figure 6C:
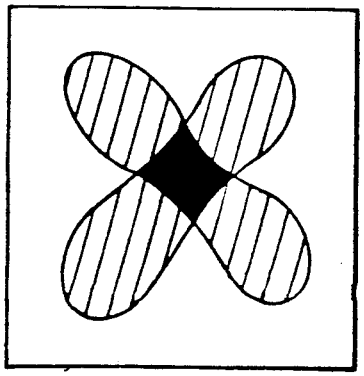
Figure 6D:
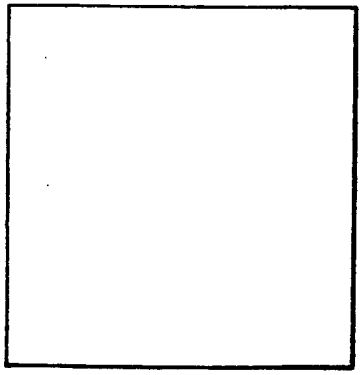
Figure 7A:
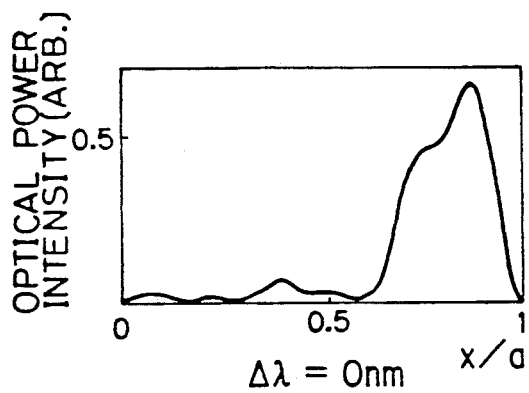
FIGS. 7A, 7B, 7C and 7D each are a graph showing optical power distribution of an optical multimode waveguide at its output terminal surface, which is intended to explain the wavelength resolution of the optical multimode waveguide used as the optical multimode circuit in the first embodiment of the present invention.
Figure 7B:
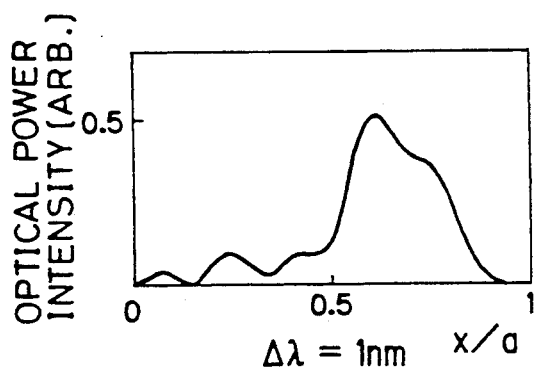
Figure 7C:
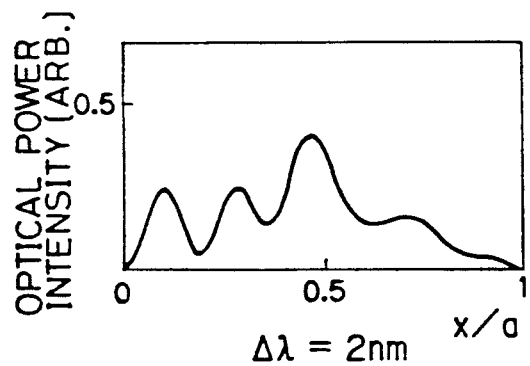
Figure 7D:
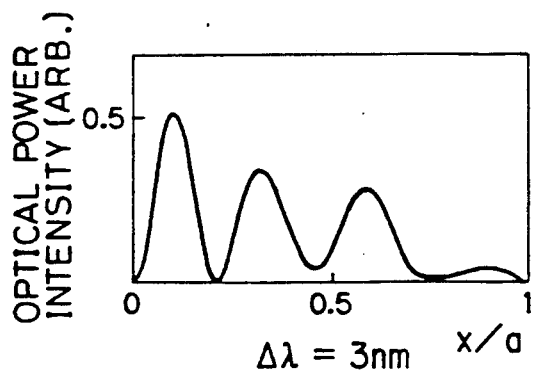

FIGS. 5A and 5B show examples of the optical power distribution on the output side terminal surface 24. FIG. 5A shows an optical power distribution when only the optical signal 21A is launched into the optical multimode circuit 22 while FIG. 5B shows an optical power distribution when only the optical signal 21B is launched into the optical multimode circuit 22. The slashed area indicates an optical power higher than that indicated by the blank area.

Assume that the two optical signals 21A and 21B are modulated with respect to their intensity with digital signals bearing different information to form wavelength multiplexed optical signals which then are introduced into the optical multimode circuit 22 via the optical wavelength of the input portion 20. Then, the optical signals can be in one of four states:

(1) a state in which the optical signals 21A and 21B are "1" and "0", respectively;

(2) a state in which the optical signals 21A and 21B are "0" and "1", respectively;

(3) a state in which the both optical signals 21A and 21B are "1"; and (4) a state in which the both optical signals 21A and 21B are "0".

FIGS. 6A, 6B, 6C and 6D respectively show the optical power distribution in the case of the above-described states (1), (2), (3) and (4) based on the examples shown in FIGS. 5A and 5B. The black area indicates an optical power higher than that indicated by the slashed area and the slashed area has an optical power which is between the optical power of the blank area and the black area.

As will be apparent from FIGS. 6A–D, the optical power distribution on the output side terminal surface 24 varies for each of the four states described above. The four optical power distribution patterns shown in FIGS. 6A, 6B, 6C and 6D, respectively, are detected with the photo-detector array 25 and the respective electric signals 26 are entered into the neural network 27. The neural network 27 has a function that enables the presetting of its internal conditions so that corresponding predetermined output patterns can be generated when predetermined input signal patterns are introduced. Assuming that the two output signals 29A and 29B from the neural network 27 have signal levels $E_1$ and $E_2$, respectively, the internal conditions of the neural network 27 can be set up such that $E_1=1$ and $E_2=0$ when the optical power distribution is the one shown in FIG. 6A, $E_1=0$ and $E_2=1$ when the optical power distribution is the one shown in FIG. 6B, $E_1=1$ and $E_2=1$ when the optical power distribution is the one shown in FIG. 6C, or $E_1=0$ and $E_2=0$ when the optical power distribution is the one shown in FIG. 6D.

FIGS. 7A through 7D are graphs illustrating by simulation the extent of the variation in the pattern caused by the the optical multimode circuit (actually, optical multimode waveguide alone). As for the optical multimode circuit including a core and a clad, a two-dimensional slab form guide which is of a multiple mode in the x-direction is taken as an example. Assuming that there occurs no penetration of the electromagnetic field into the clad, the distribution of the electromagnetic field of the n-th mode is expressed in a scalar amount as follows:

$$E_n = \sin(\pi n x / a) \quad (1)$$

where a indicates the width of the core.

It is assumed that the core has a refractive index of 1.46 and that, NA and the width of the core are 0.2 and 22.5 μm, respectively. These values correspond to the case where the highest mode number is 6. The length of the guide is set up as 10 cm. What is connected to the photo-detector array is a near field pattern of a optical multimode waveguide.

The calculation is performed assuming that the six modes represented by the equation (1) above are excited uniformly on the input side terminal surface of the optical multimode waveguide. FIGS. 7A–D show the optical power distribution on the output side terminal surface when the wavelength of the optical signal increase by 1 nm starting from 1,550 nm. From this it follows that in order for a clear change to be observed in the optical power distribution, it is necessary and sufficient that there occurs a change in wavelength on the order of 1 nm. The extent of this wavelength dependence is proportional to the second power of the length and NA (numerical aperture) of the optical multimode circuit.

Furthermore, in order to demonstrate the realizability of the optical receiver according to this embodiment, experiments have been performed using the same configuration shown in FIG. 4 except that two photo-detector arrays and a two input/two output type neural network are used to carry out demultiplexation at a rate of two wavelengths/100 Mbits/s. The results obtained are shown in FIGS. 8A through 8C.

Figure 8A:
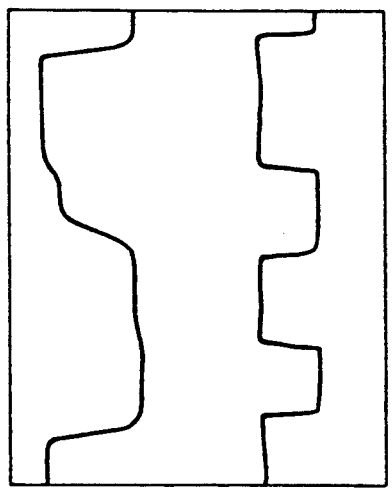
Figure 8B:
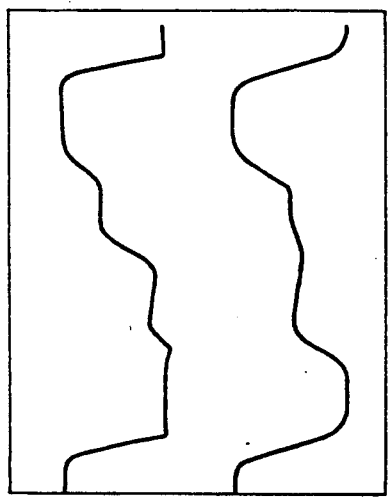
Figure 8C:
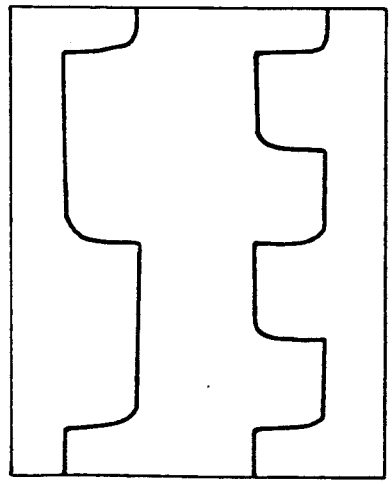

FIG. 8A shows the transmitted waveforms for signals of $\lambda_1$ (upper trace) and $\lambda_2$ (lower trace) including for states: $(\lambda_1, \lambda_2) = (0,0), (0,1), (1,0)$ or $(1,1)$. The detected waveforms at the two photo-detector arrays are shown in FIG. 8B. The optical signals for $\lambda_1$ and $\lambda_2$ are superimposed in each waveform according to the optical power distribution. The neural network correctly regenerates the original signals as shown in FIG. 8C.

From this it follows that even if optical signals 21A and 21B which have different wavelengths and have been modulated with respect to their intensity with different signals are received at the optical input portion 20 in FIG. 4 in a wavelength multiplexed state, the original modulation signals can be regenerated at the output ports 30A and 30B of the neural network 27 in accordance with the embodiment shown in FIG. 4.

In the above description, an example was taken for simplicityt which used intensity modulated optical signals. However, the present invention is applicable not only to such intensity modulated cases but also to frequency modulated cases. In the case of intensity modulation, the optical power distributions A-1 and A-2 shown in FIGS. 5A and 5B, respectively, appear or disappear on the terminal surface corresponding to the states of "1" or "0" of the optical signals 21A and 21B having different wavelengths. On the other hand, in the case of frequency modulation, the optical power distribution assumes two patterns corresponding to the state "1" or "0" of the optical signal 21A. Therefore, there appear four different patterns for two wavelengths of multiplexed signal light. This is because the intensity of the light is constant and only the frequency assumes two values in the case of digital frequency modulation and therefore there appear optical power distributions corresponding to the respective frequencies on the output side terminal surface 24. If the internal conditions of the neural network 27 are set up taking into consideration the four patterns, the original modulation signals can be regenerated similarly to the case of intensity modulation. Here, bivalent digital frequency modulation has been explained. However, the same idea is of course valid for multivalent digital frequency modulation.

In the foregoing, although the first embodiment of the present invention has been explained with reference to FIGS. 4, 5A and 5B, 6A through 6D, 7A through 7D and 8A through 8C, the configuration of the optical receiver of the present invention should not be construed as being limited to the one shown in FIG. 4 or to those described in the following embodiments but obviously there may be made various variations thereon as described, for example, in (1) to (10) below.

That is, in the first embodiment of the present invention the following measures may be taken.

(1) In the above description, the number of the optical signals with different wavelengths is 2, that of the elements of the photo-detector array 25 is 4, that of the input ports 28 of the neural network 27 is 4, that of the output ports 30 of the neural network 27 is 2, and that of the output signals is 2. However, these numbers may be set up freely depending on the purpose.

(2) Although it has a shape of a three-dimensional optical waveguide, the optical multimode circuit 22 may be a two-dimensional optical waveguide in the form of a slab. Similarly, the photo-detector array 25 can be made a one-dimensional array instead of the two-dimensional array.

(3) The optical parts or optical circuits are connected to each other directly or through space. However, it is possible to arrange a lens system or systems so as to intervene therebetween at a desired position or positions.

(4) The photo-detector array 25 detects optical an power distribution on the output side terminal surface 24 as it is. More particularly, a near field pattern of the optical power on the terminal surface 24 is detected by the photo-detector array 25. In contrast, the output side terminal surface 24 and the photo-detector array 25 may be connected to each other in a spatially remote state. In this case, a far field pattern of the optical power on the output side terminal surface 24 is detected by the photo-detector array 25. The far field pattern, like the near field pattern, varies in accordance with difference in the wavelength of the optical signal 21. Therefore, a processed signal output similar to that in the case of the near field pattern described above can be obtained by introducing the electric signals 26A-D from the photo-detector array 25 into the neural network 27.

(5) There are two types of input signal light 21 obtained by wavelength multiplexing signal light which has been digitally modulated for its intensity. One is a type in which the wavelengths are synchronized with each other and the other is a type in which the wavelengths are not in synchronization. In the present invention, both of them are applicable. However, in synchronized systems, timing pulses must be inputted for achieving synchronization for the non-linear processor in the neural network. Of course, the synchronized systems can operate at higher maximum speeds.

(6) The optical multimode circuit 22 may be a small size optical circuit, for example, the one which can be placed in one apparatus or a long optical multimode fiber of, for example, several tens of kilometers long. In the latter case, the left hand side terminal of the device shown in FIG. 4 corresponds to the transmission side of the optical transmission system and the right hand side thereof corresponds to the receiver side of the optical transmission system.

(7) The optical input portion 20 is used for introducing the optical signal 21 into the optical multimode circuit 22. Of course, the optical input portion 22 may be an optical space beam in place of the optical waveguide as shown in FIG. 4.

(8) Although the photo-detector array 25 and the neural network 27 are connected to each other directly, electronic circuits such as amplifiers may be inserted therebetween, if desired.

(9) Although optical signals containing a plurality of wavelengths are introduced into the optical multimode circuit, the same processing as shown in FIG. 4 is possible when optical signals are of a single wavelength if the wavelength varies continuously or discontinuously with the lapse of time. In the case, the optical power distribution on the output side terminal surface 24 varies as the wavelength varies, which makes it possible to detect the variation in wavelength from an output of the neural network 27.

(10) The photo-detector array 25 directly detects the optical power distribution on the output side terminal surface 24 of the optical multimode circuit 22. On the other hand, in the field of optical communication, there are in addition to such direct detection techniques as described above so-called heterodyne detection techniques or homodyne detection techniques in which light from a local transmission light source provided on the transmission side is mixed with the optical signal received before a detection can be performed (cf., e.g., Shimada: "Coherent Optical Communication", Electronic Information Communication Association, (1988)). The features of the detection techniques are in that the influence of thermal noises in the photodetector can be supressed to thereby improve the sensitivity of the photodetection. In the present invention, the heterodyne or homodyne detection techinques may be adopted.

Figure 9:
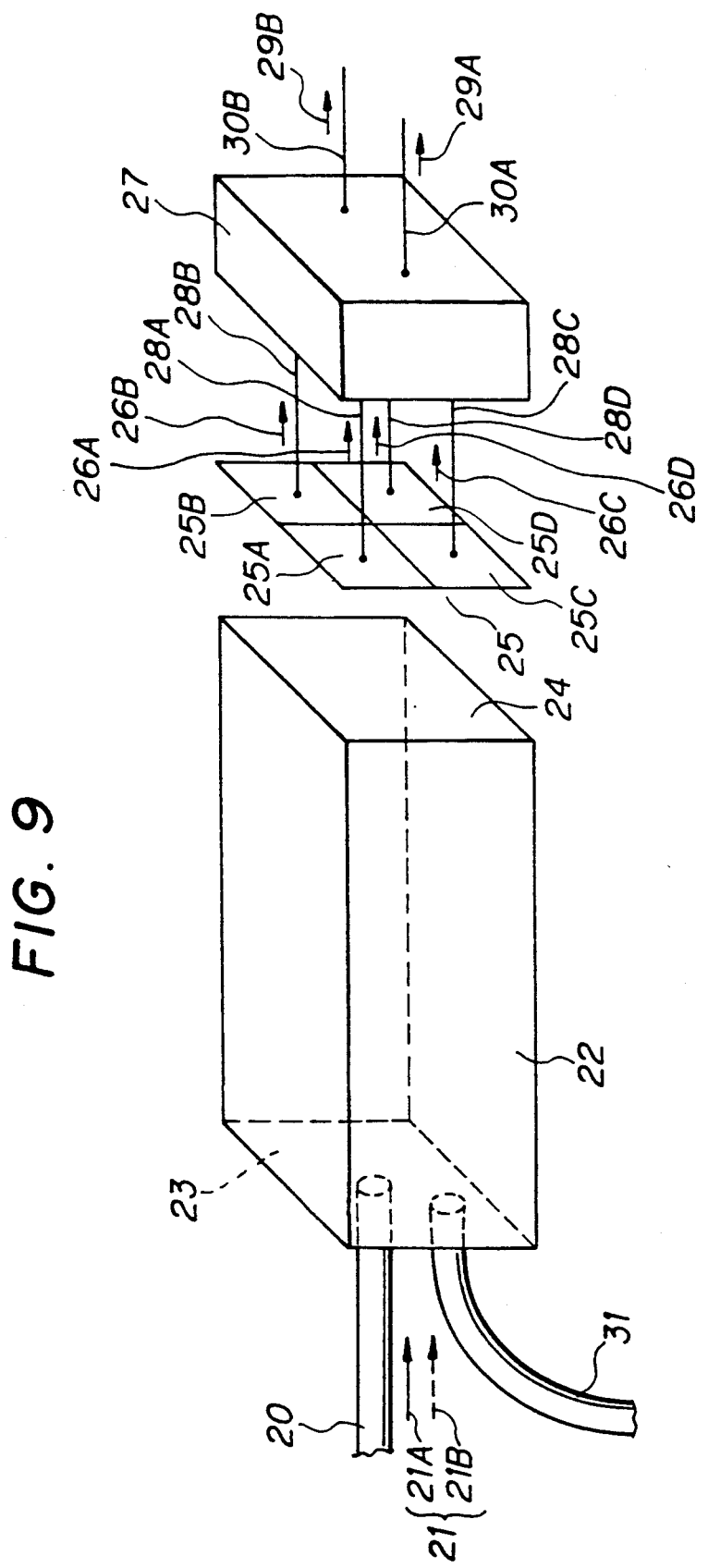

FIG. 9 exemplifies a configurtation of the optical receiver in the above-described case. In FIG. 9, a part indicated by reference numeral 31 newly added to the configuration shown in FIG. 4 is an optical waveguide for introducing light from the local transmission light source provided on the receiver side into the optical multimode circuit 22. In FIG. 9, the optical waveguide 31 is connected directly onto the input side terminal surface 23 of the optical multimode circuit 22. To perform heterodyne detection, i.e., to detect the received optical signals (from the optical input portion 20) after mixing them with the light from the local transmission light source provided on the transmission side (from the optical waveguide 31), it is necessary to conduct premixing sufficiently. Therefore, although there may also be employed without particular disadvantages a configuration in which the optical waveguide 31 is connected directly to the input side terminal surface 23 of the optical multimode circuit 22 as shown in FIG. 9, it is preferred to use another configuration in which the optical waveguide 31 is connected to the optical input portion 20 upstream of the optical multimode circuit 22.

Although no description has been made hereinbefore, the neural network 27 may be hardware composed of one or more electronic or optical circuits, or it may be a computer which has input and output terminals and is controlled by software.

As described above, the neural network 27 is a signal processing network constructed of a plurality of addition circuits and processors which together performs weighted addition of signals from a plurality of input ports, and a plurality of connection elements which connect non-linear processors to each other for the input signals; and it is an optical circuit which has functions of recognition, association, learning and the like of input signals into the whole network. In the present invention, it is preferred that the circuit has a learning function.

Figure 10:
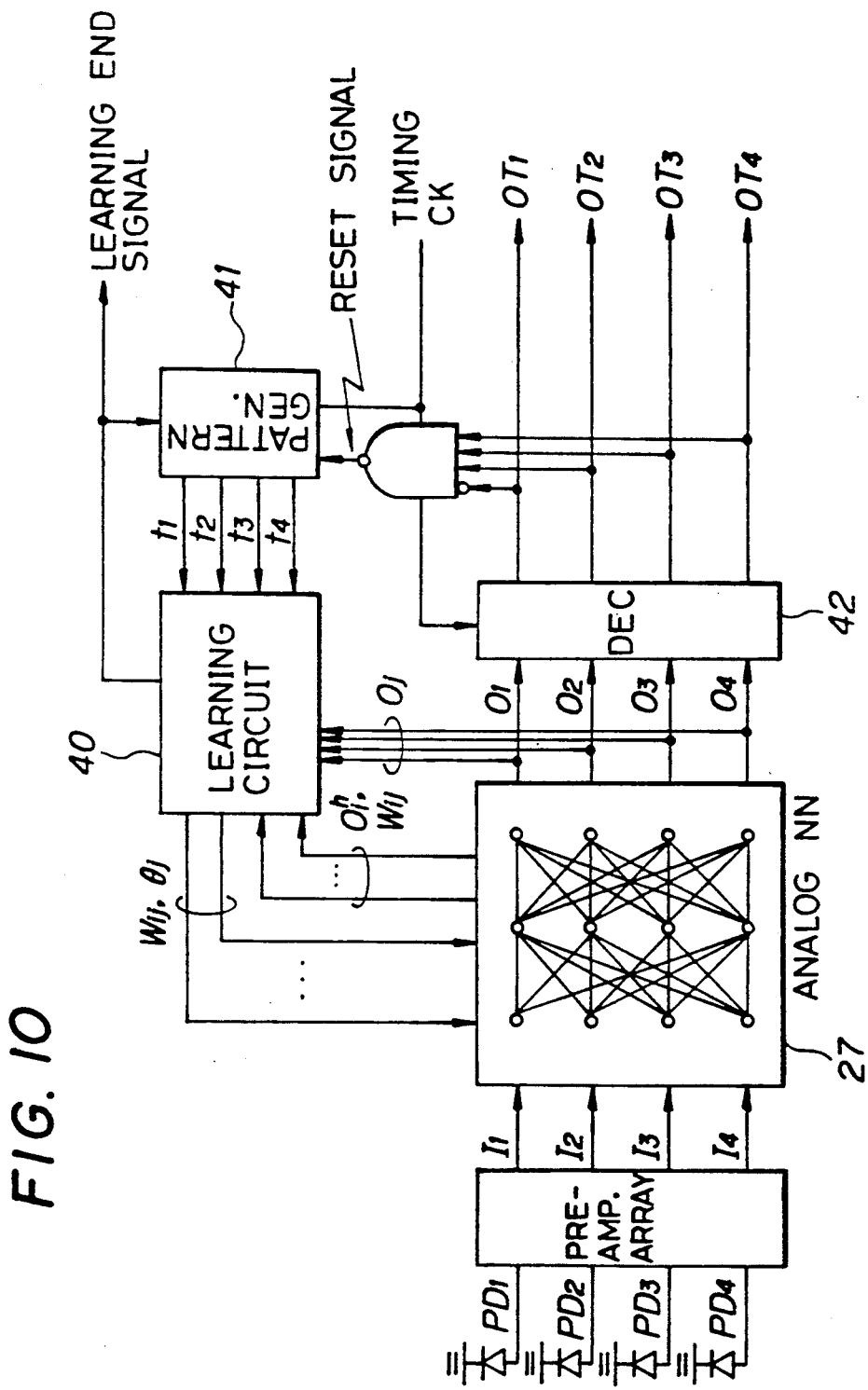
Figure 11:
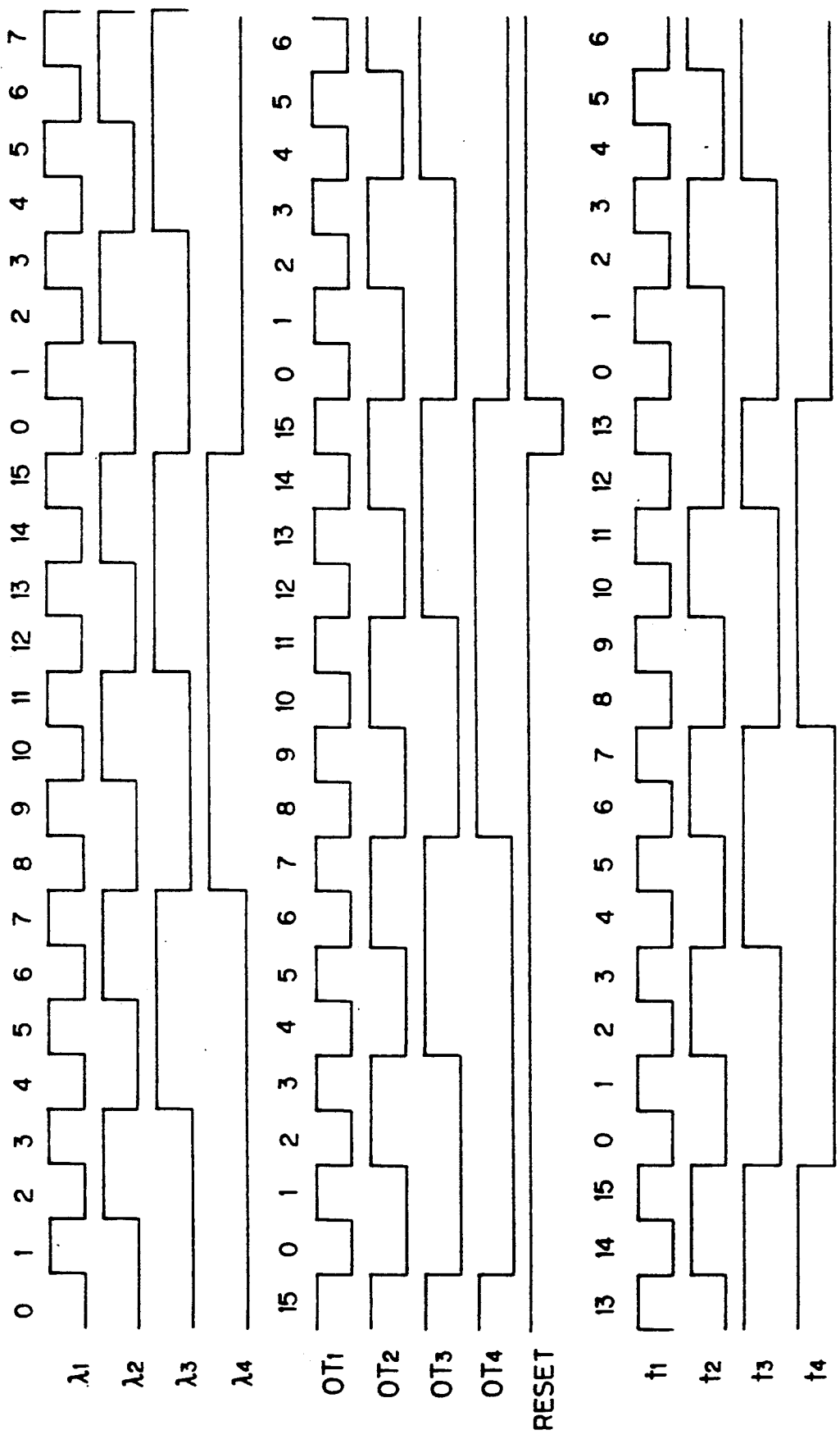

FIG. 10 exemplifies a configuration of an optical receiver with such a neutral network (NN) having a learning function and FIG. 11 shows a timing chart relative to the operation thereof. In the case where the neural network has a learning function, a learning circuit 40 and a pattern generator 41 are added as parts of the neural network 27. The learning circuit 40 renews weight (W) and threshold value ($\theta$) of the neural network 27 in accordance with the contents of advanced learning. The pattern generator 41 also generates teacher signals.

A learning operation is as follows. First, the light source repeatedly outputs $2^4 = 16$ patterns, as indicated by $\lambda_1$ to $\lambda_4$ shown in FIG. 11. The optical signals are converted into electric signals by the photo-detector array 25 and then subjected to pattern recognition by the neural network 27 to be outputted as signals $D_j$ ($j = 1, 2, 3$ or $4$). Since they are subjected to S-form mild recognition processing, the signals show analog-type amplitudes. The learning proceeds by comparing the amplitude of the output signals $O_j$ with that of the teacher signals $t_j$, and gradually renewing the internal conditions (weight: $W_{ij}$, threshold value: $\theta_i$) of the neural network so that the state function $E = \Sigma(t_j - O_j)^2$ can be at a minimum. Upon the comparison, the pattern in which the teacher signals $t_j$ are generated must coincide with the pattern of signals output from the light source. For example, when the light source side signals assume a fourteenth signal pattern shown in FIG. 11, learning becomes nonsense unless the teacher signals are of the same pattern as the fourteenth pattern shown in FIG. 11. However, it is not always the case that the patterns coincide with each other when the launching of the signals is initiated. In FIG. 11, the teacher signal pattern is at an eleventh pattern when the light source side signal pattern is the fourteenth one.

Therefore, there is a need for the synchronization of the patterns. Pattern synchronization can be realized by resetting the pattern generator with a reset signal as shown in FIG. 10. The generation of rest signals is realized by a NAND gate in the configuration of this embodiment. When the signal of the fourteenth pattern is introduced into the NAND gate, a reset signal is generated and the pattern generator begins to produce an output starting from the 0 (zero)-th pattern. As for the input signal to be introduced into the NAND gate, there can be used signals OT which are obtained by recognizing and regenerating the output signals $O_j$ from the neural network by a recognizer with a timing clock. Delay due to the light source signal occurs in regenerated signals $OT_j$, and the amount of the delay in the example shown in FIG. 11 amounts to one time slot equivalent.

After the pattern synchronization is achieved, the learning for 16 patterns is performed a plurality of times, and the learning circuit sends a learning end signal as soon as the value of the state function E becomes smaller than a predetermined value to terminate the learning.

SECOND EMBODIMENT

Figure 12:
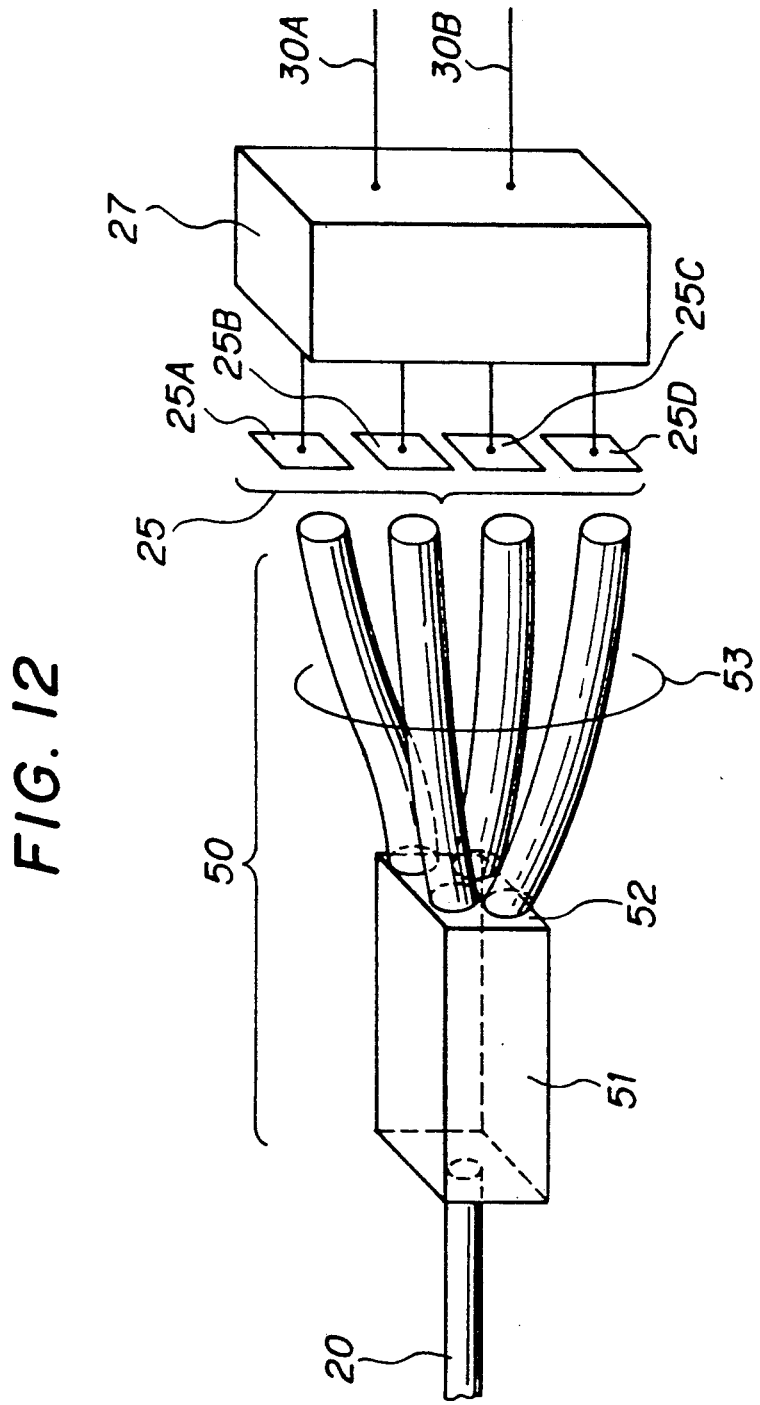
FIG. 12 is a schematic perspective view of an optical receiver according to the second embodiment of the present invention.

FIG. 12 illustrates the second embodiment of the present invention. The same reference numerals or symbols are used for the same parts or members as those used in the first embodiment shown in FIG. 4. A major difference between the second embodiment shown in FIG. 12 and the first embodiment shown in FIG. 4 is that the optical multimode circuits have different configurations from each other. In the first embodiment, (i) only the optical multimode waveguide is used while in the second embodiment there is used (ii) an optical multimode circuit so constructed by an optical multimode waveguide 51 and a plurality of optical waveguides 53 connected to its output side terminal 52. In this embodiment, the number of the optical waveguides is 4. The four optical waveguides are provided on the output side terminal 52 with the photo-detector array 25 being composed of four elements 25A through 25D.

THIRD EMBODIMENT

Figure 13:
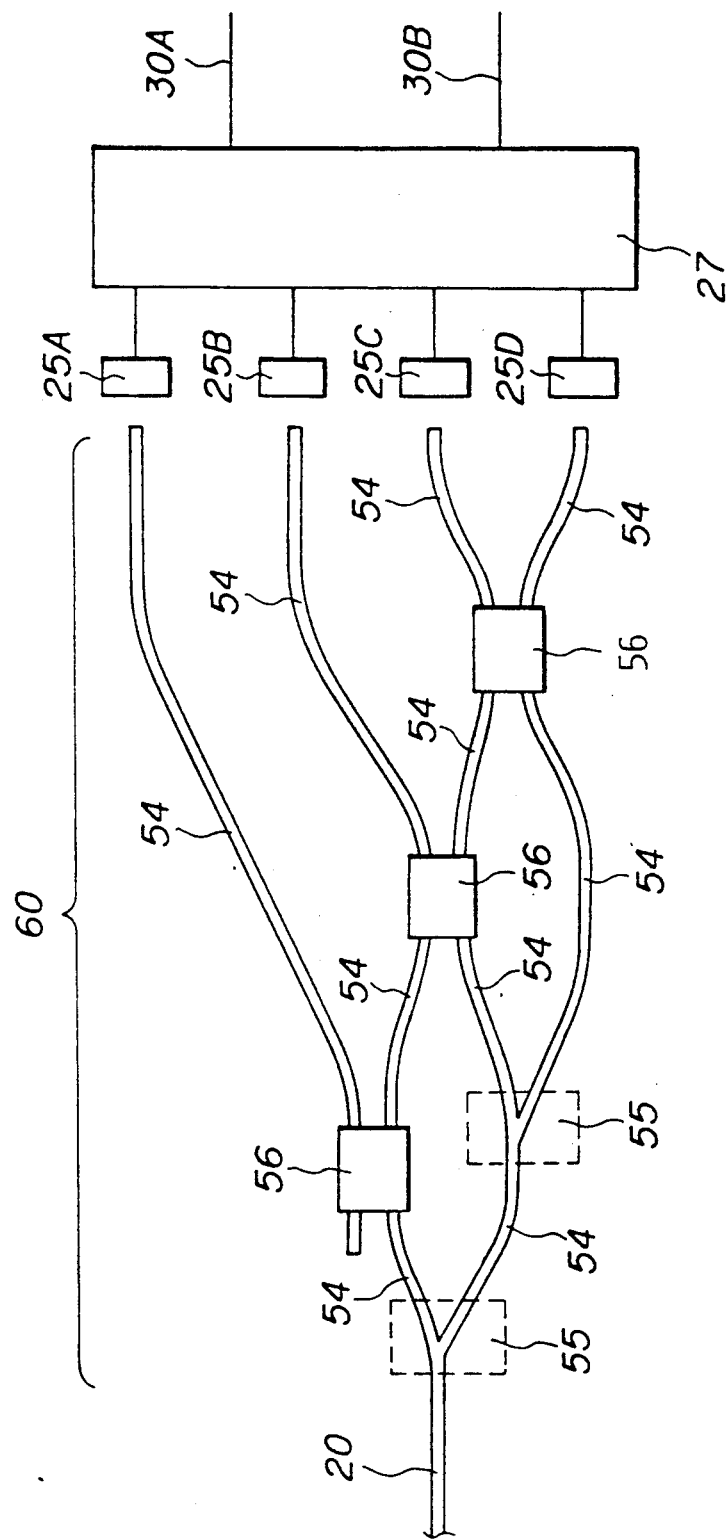
FIG. 13 is a schematic perspective view of an optical receiver according to the third embodiment of the present invention.

FIG. 13 illustrates the third embodiment of the present invention. The same reference numerals or symbols are used for the same parts or members as those used in the first embodiment shown in FIG. 4. A major difference between the second embodiment shown in FIG. 13 and the first embodiment shown in FIG. 4 is also a difference in the configuration of the optical multimode circuit used. In the third embodiment, there is used as the optical multimode circuit 60 constructed by (iii) a combination of a plurality of optical waveguides 54, directional couplers 56 and Y-branch devices 55. In this embodiment, the number of the optical waveguides is 4. Many types of optical circuits can be realized by changing the combination. Needless to say, the conventional optical demultiplexer shown as an example of the prior art may be included as a part of the optical circuit described above.

FOURTH EMBODIMENT

Figure 14:
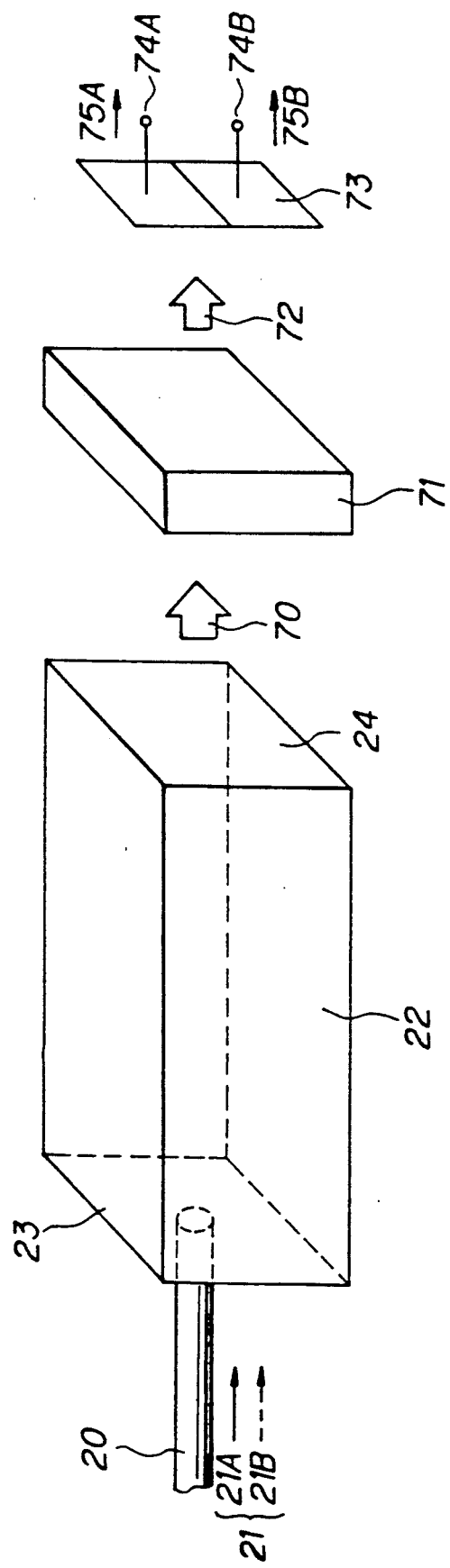

FIG. 14 illustrates the fourth embodiment of the present invention. The same reference numerals or symbols are used for the same parts or members as those used in the first emodiment shown in FIG. 4. A major difference between the fourth embodiment shown in FIG. 14 and the first embodiment shown in FIG. 4 is that the pattern recognition means for recognizing spatial power distribution is different between the two embodiments. In the first embodiment, the pattern recognition means is (i) the photo-detector array 25 and the neural network 27 while in this embodiment pattern recognition is performed by (ii) a hologram element 71 and a photo-detector array 73.

The output light from the optical multimode circuit 22 is connected to the hologram element 71. In hologram element 71, the output light 70 from the optical multimode circuit 2 is processed depending on the wavefront conditions thereof with the information stored in the hologram element 71 to form output light 72 which is different from output light 70. The output light 72 from the hologram element 71 is connected to a photo-detector array 73 and converted into electric signals. As result, final output signals 75A and 75B can be obtained from output ports 74A and 74B, respectively, of the photodetctor 73.

Figure 15:
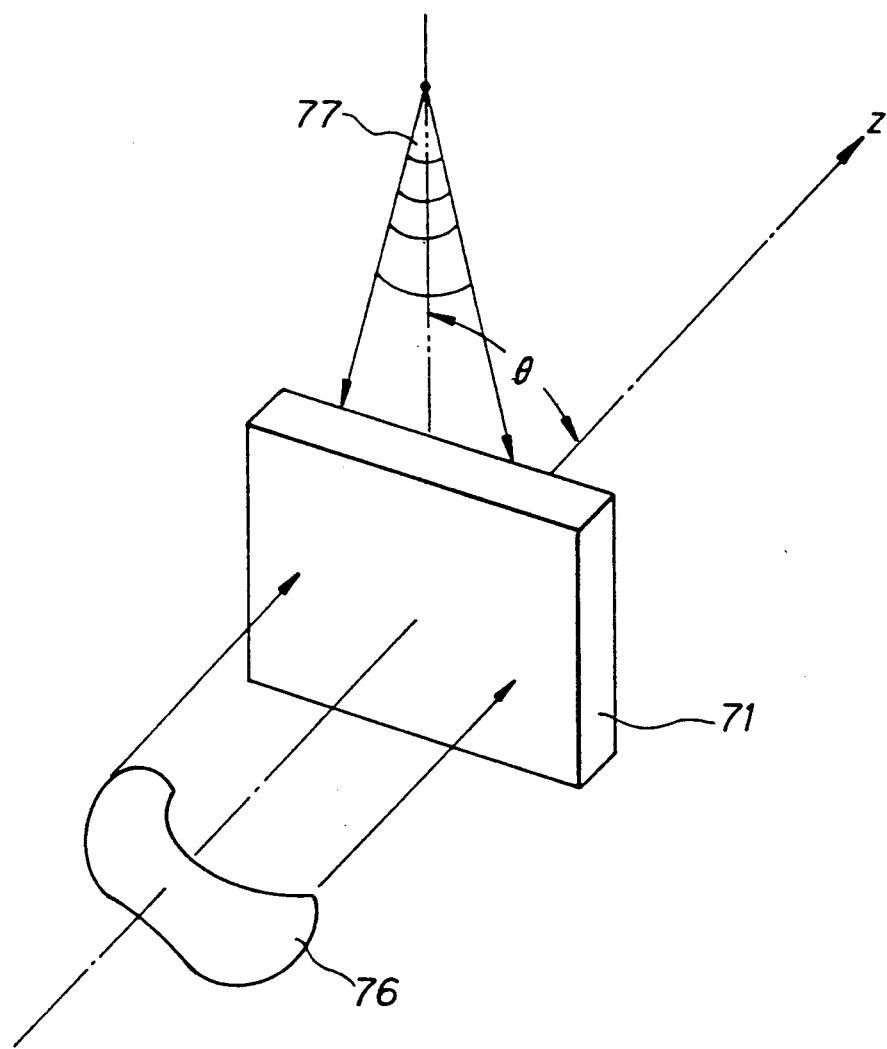

The hologram element 71 must store or memorize an output pattern 76 from the optical multimode circuit 22 before it can operate. For memorization of the output pattern, a reference light or wave 77 is used as shown in FIG. 15 in the same manner as in the conventional technique to cause interference with the signal light or wave bearing information on the output pattern 76 and the hologram element is sensitized with the resulting interfered pattern. The reference light 77 is irradiated in the direction at an angle of $\theta$ with respect to the direction in which the output pattern 76 is propagated. The angle $\theta$ varies depending on the wavelength of the reference light.

When it is irradiated to the memorized hologram element 71, the output pattern 76 is diffracted in the direction of the reference light 77. Therefore, there arise diffraction waves in directions corresponding to the respective wavelengths, which makes it possible to perform wavelength separation. When a spherical wave which is propagated from a point source of light is used as the reference wave, a diffracted wave becomes a beam focusing on the position of the point source of light, and therefore wavelength separation is facilitated by arranging a photo-detector array 73 at the very position of the focusing. In the case where a broad parallel beam is used as the reference wave, a diffracted wave is also a broad beam which distributes on the photo-detector array 73. In the latter case, a neural network is arranged downstream of the photo-detector array in the manner described hereinbelow in order to perform recognition processing.

Figure 16A:
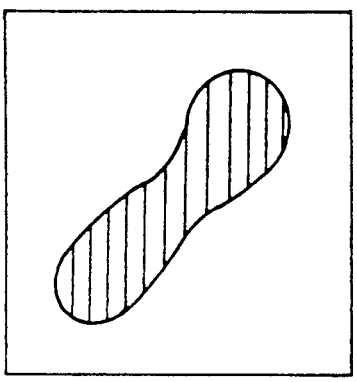
FIGS. 16A and 16B each are a diagram exemplifying an optical power distribution at a terminal surface for each wavelength of output light from the optical multimode circuit used in the fourth embodiment of the present invention.
Figure 16B:
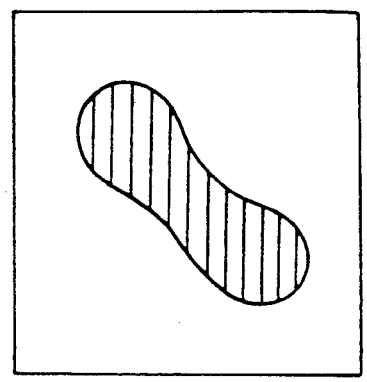
Figure 17A:
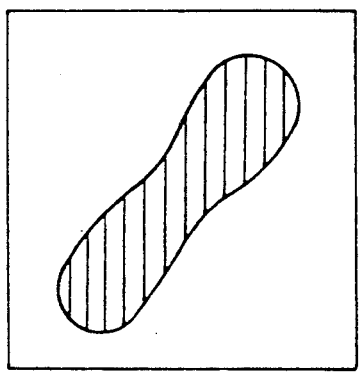
Figure 17B:
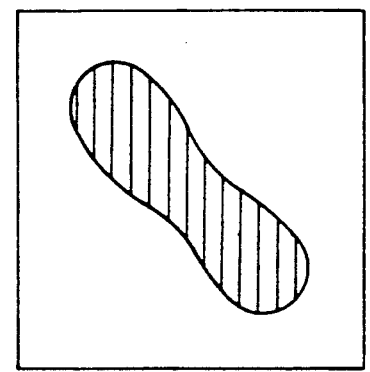
Figure 17C:
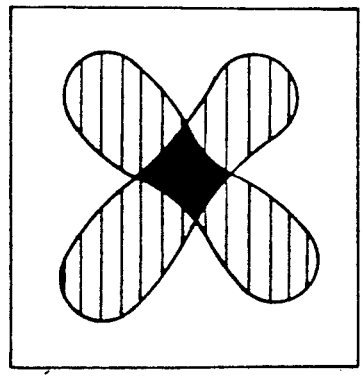
Figure 17D:
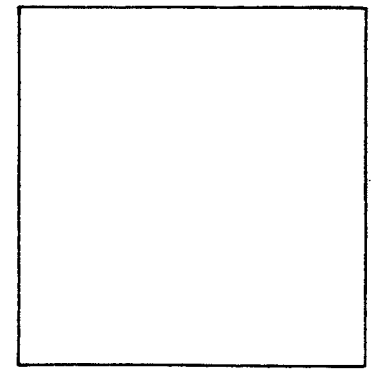

In the embodiment shown in FIG. 14 which has the configuration as described above, like the first embodiment described above, the optical power distribution appearing on the output side terminal surface 24 of the optical multimode circuit 22 is different between the case where only the optical signal 21A having a predetermined wavelength is launched into the optical multimode circuit 22 and the case where only the optical signal 21B having another predetermined wavelength is launched thereinto. For example, the optical power distribution shown in FIG. 16A is outputted for the optical signal 21A having first wavelength while the optical power distribution shown in FIG. 16B is outputted corresponding to the optical signal 21B having second wavelength, and in this manner an input optical signal with a different wavelength gives rise to an output optical power distribution of a different pattern. Likewise, when the two optical signals 21A and 21B are subjected to intensity modulation with respective different digital signals and the resulting wavelength multiplexed signals are launched into the optical multimode circuit 22 via the optical input portion 20, the optical signals received may be in one of four states. The optical power distributions on the output side terminal surface 24 for the four states are as shown in FIGS. 17A, 17B, 17C and 17D, respectively. The four distribution patterns are entered into a hologram element 71. Also in the hologram element 71, like the case with the neural network 27 described in the first embodiment, it is possible to set up the internal conditions thereof so that the hologram output light 72 corresponds to one of the optical power distributions shown in FIG. 17A throughout 17D based on the signal levels of two output signals 75A and 75B from a photo-detector array 73.

From the above it follows that even when the optical signals 21A and 21B which have different wavelengths and have been modulated for their intensities with different signals are received in the input optical waveguide 20 shown in FIG. 14 in a wavelength multiplexed state, it is possible according to the timing charts shown in FIG. 11 to regenerate the original modulation signals also in output ports 74A and 74B of the photo-detector array 73.

In the foregoing, intensity modulated optical signals have been exemplified in the preceding embodiments in order to simplify the explanation. However, the present invention is applicable not only to the case where intensity modulation is used but also to the case where frequency modulation is adopted. Likewise, the same idea is no doubt applicable to the case where multivalent digital frequency modulation is performed although description has been made herein on the case of using binary digital frequency modulation.

Although an explanation has been made on the fourth embodiment as described above, the present invention is not limited to the configuration shown in FIG. 14 or scope shown in various embodiments referred to hereinafter but various variations may be made which are similar to the variations (1) to (10) described above with respect to the first embodiment. In this case, care must be taken on various modifications in the configuration such as replacement of the neural network by the hologram element.

Though not described earlier, the hologram element 71 may be the one on which information is stored on a two-dimensional plate or the one in which information is stored three-dimensionally using three-dimensional optical crystals.

FIFTH EMBODIMENT

Figure 18:
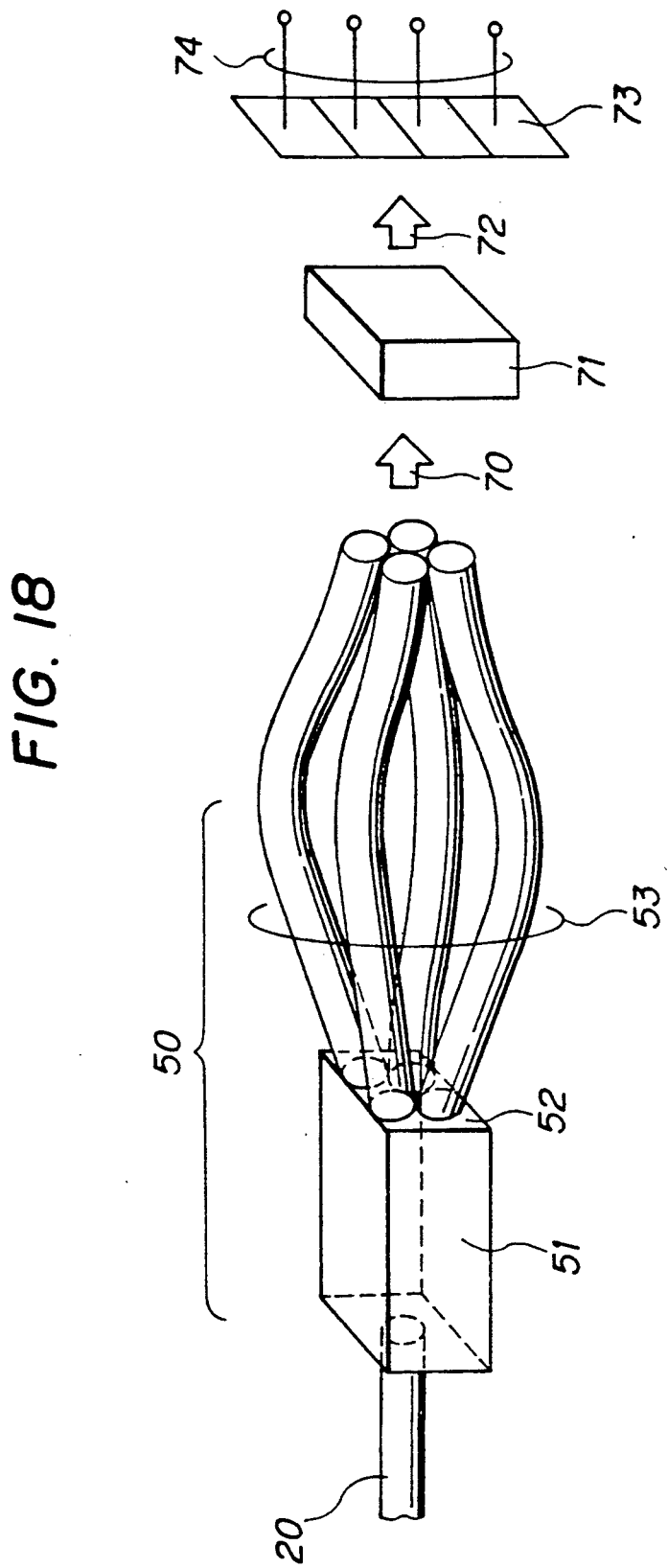
FIG. 18 is a schematic perspective view of the configuration of an optical receiver according to the fifth embodiment of the present invention.

FIG. 18 illustrates the fifth embodiment of the present invention. The same reference numerals or symbols are used for the same parts or members as those used in the fourth embodiment shown in FIG. 14. A major difference between the fifth embodiment shown in FIG. 18 and the fourth embodiment shown in FIG. 14 is that the optical multimode circuit 50 has a new configuration in the fifth embodiment in place of the optical multimode circuit 22 used in the fourth embodiment. The optical multimode circuit 22 is a single optical multimode waveguide while the optical multimode circuit 50 in the fifth embodiment is constructed by a plurality of optical waveguides (four optical waveguides in this embodiment). In other words, the optical multimode waveguide 51 and the four optical waveguides 53 connected to the terminal surfaces 52 of the optical multimode waveguide function together as the optical multimode circuit 50. This configuration is similar to that of the optical receiver according the the second embodiment shown in FIG. 12. The photodetector array 73 is connected to the four optical waveguides 53 via the hologram element 71.

SIXTH EMBODIMENT

Figure 1:
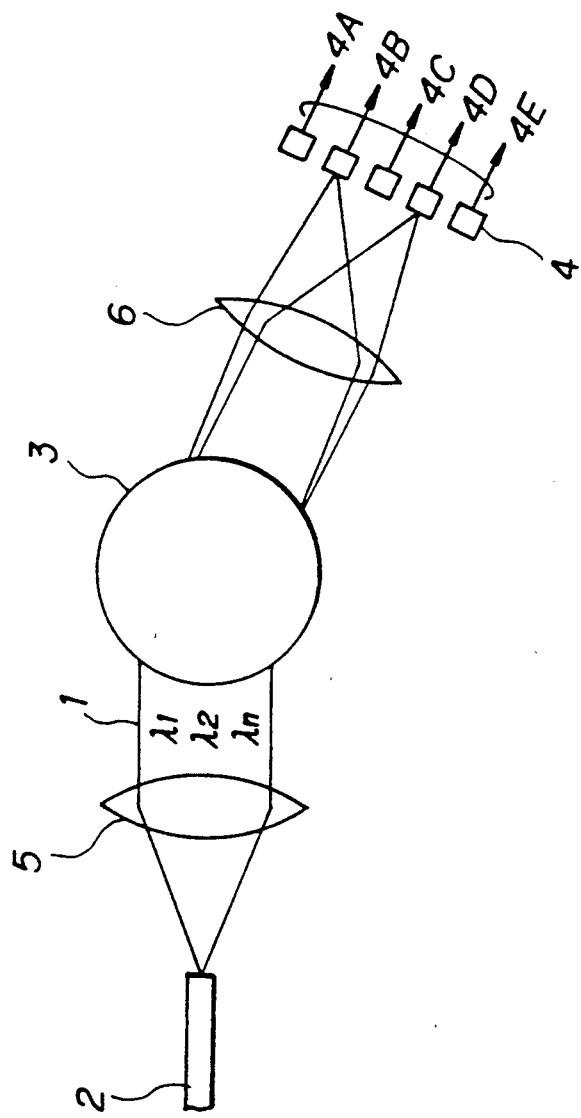
FIG. 1 is a schematic view which illustrates an example of a conventional optical receiver.
Figure 2:
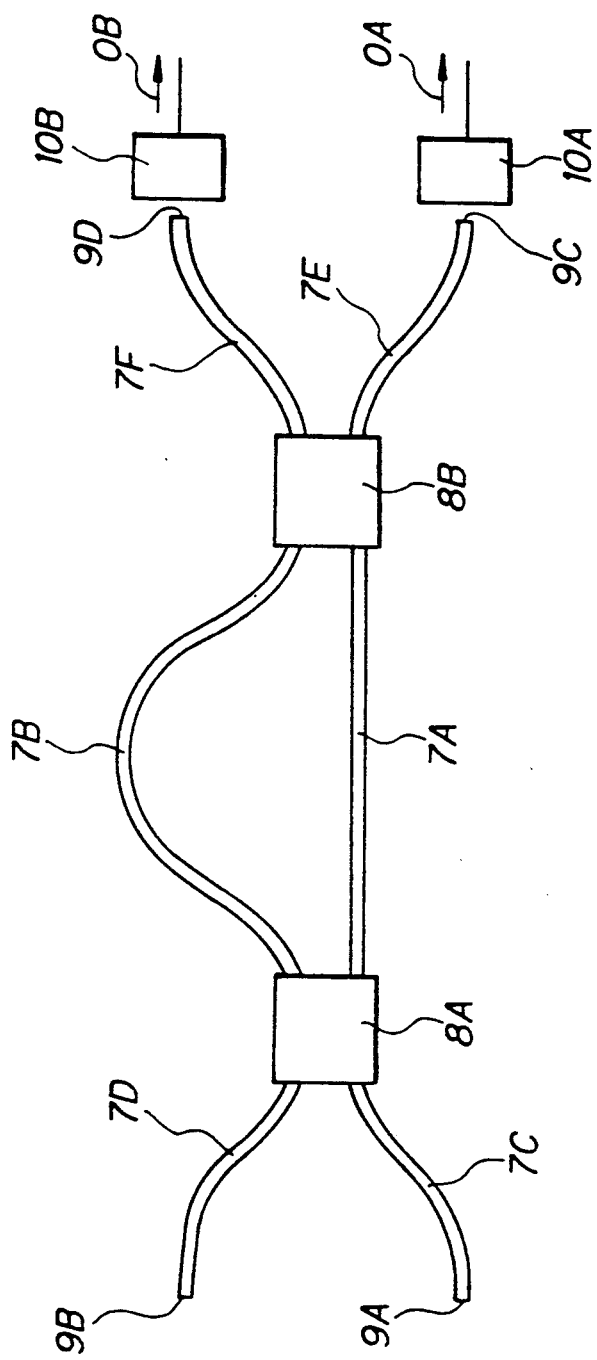
FIG. 2 is a schematic view which illustrates another example of a conventional optical receiver.
Figure 3:
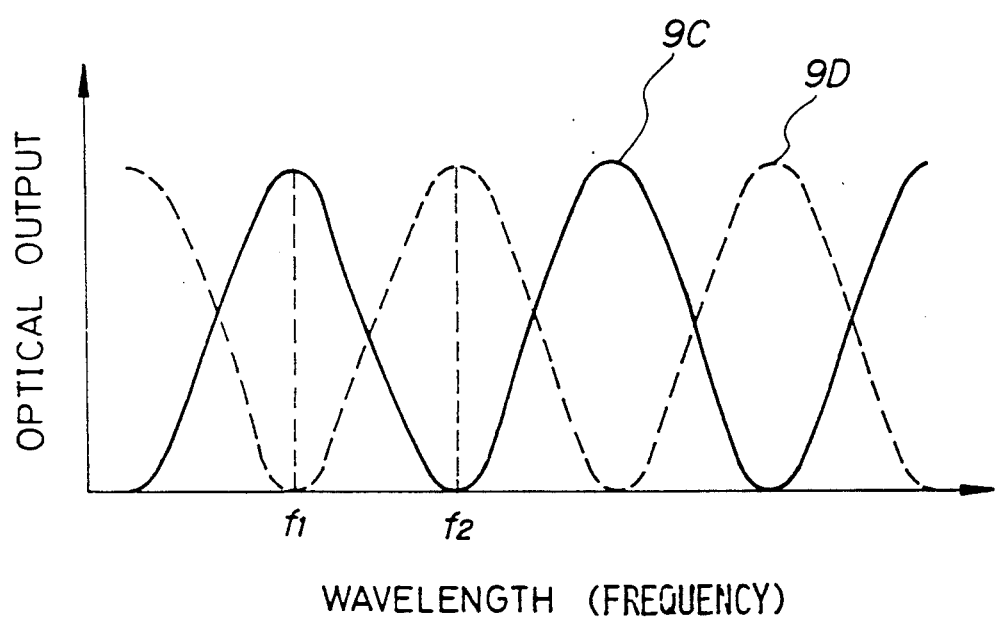
FIG. 3 is a graph showing output characteristics of the conventional optical receiver shown in FIG. 2.
Figure 19:
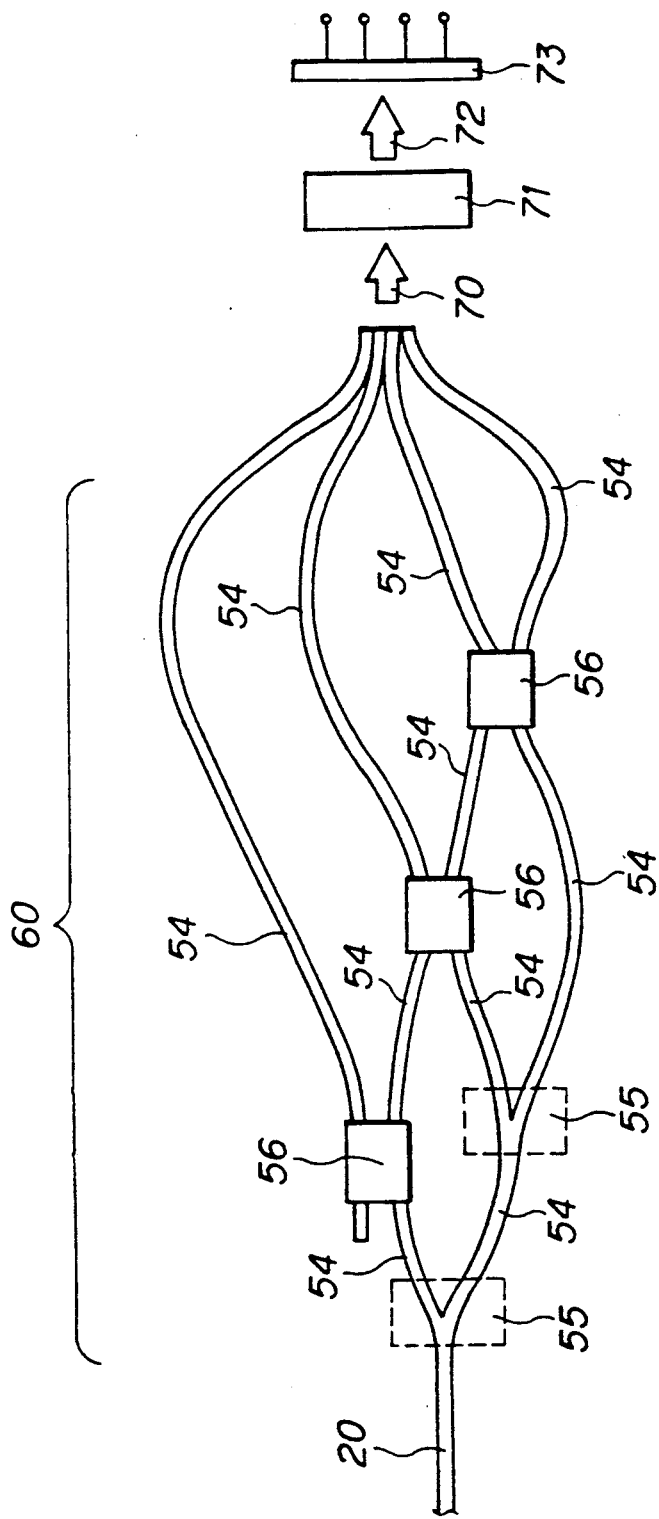
FIG. 19 is a plan view of the configuration of an optical receiver according to the sixth embodiment of the present invention.

Fig. 19 illustrates the sixth embodiment of the present invention. The same reference numerals or symbols are used for the same parts or members as those used in the third and fourth embodiment shown in FIGS. 13 and 14, respectively. A major difference between the sixth embodiment shown in FIG. 19 and the fourth embodiment shown in FIG. 14 is, like in the case of the fifth embodiment, that the optical multimode circuit 60 has a new configuration in this embodiment in place of the optical multimode circuit 22 used in the fourth embodiment. The optical multimode circuit 22 is a single optical multimode waveguide while the optical multimode circuit 60 in the fifth embodiment is constructed by a plurality of optical waveguides In other words, a combination of a plurality of the optical waveguides 54 and the optical branching circuit 55 and the directional coupler 56 connected to each other functions as the optical multimode circuit 60 in this embodiment. This configuration is similar to that of the optical receiver according to the third embodiment shown in FIG. 13. In this configuration, many types of optical circuits can be constructed by changing the combination and connection of the optical waveguides 54. Of course, the optical demultiplexer constructed by a single mode optical waveguide as illustrated in FIG. 2 as an example of conventional optical demultiplexer is also included in the optical receiver according to the present invention as a part thereof.

SEVENTH EMBODIMENT

Figure 20:
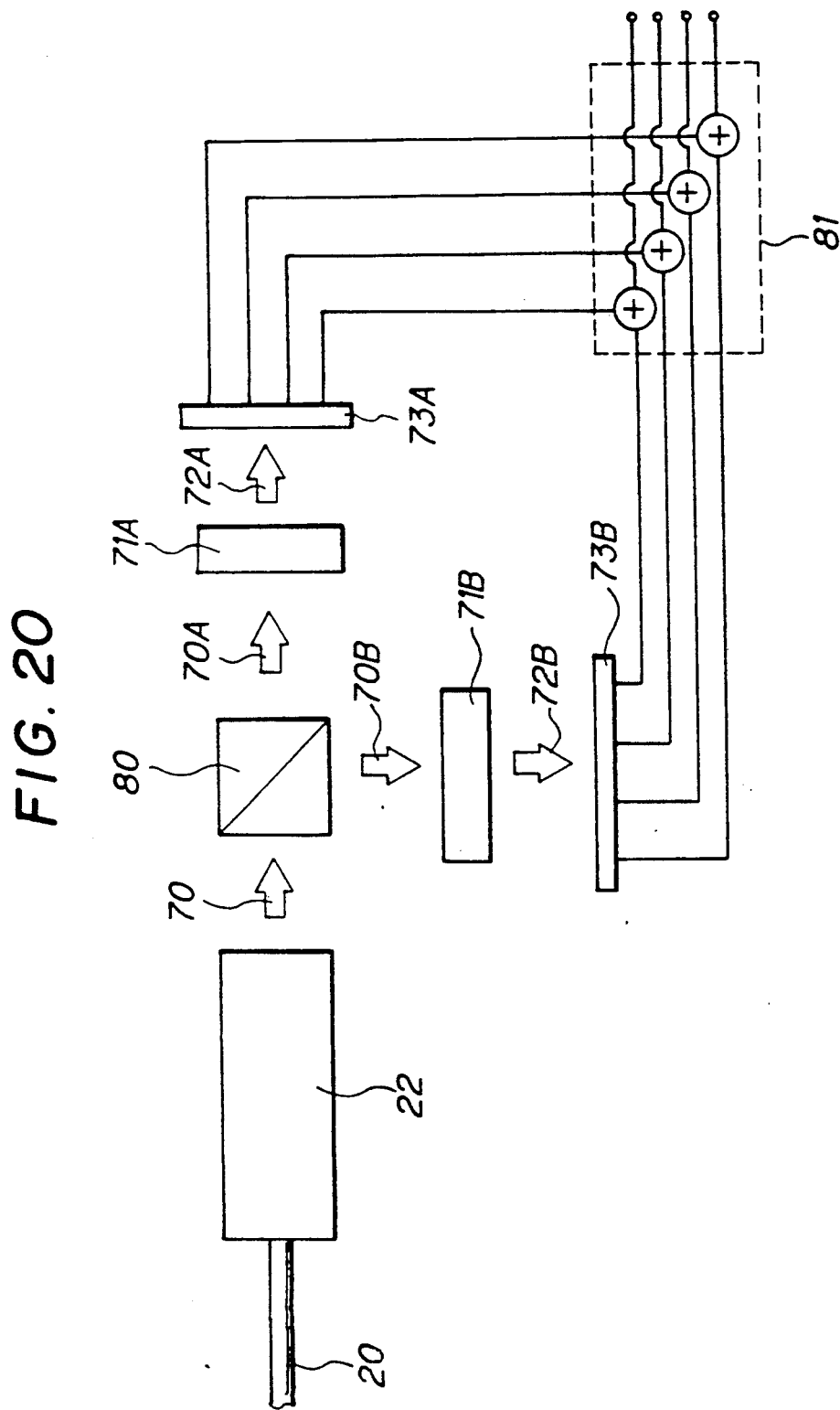
FIG. 20 is a plan view of the configuration of an optical receiver according to the seventh embodiment of the present invention.

FIG. 20 illustrates the seventh embodiment of the present invention. In this embodiment, a polarization separation element 80 is inserted between the optical multimode circuit 22 and the hologram element 71A and 71B. After the output light 70 from the optical multimode circuit 22 is separated into polarized light rays 70A and 70B, the respective polarized light rays 70A and 70B are connected to the two hologram elements 71A and 71B. Output light rays 72A and 72B from the hologram elements 71A and 71B, respectively, are connected to two photo-detector arrays 73A and 73B arranged downstream thereof, and output signals from the photo-detector arrays 73A and 73B are added and outputted by an addition circuit 81. Usually, the optical signal 21 launched into the optical waveguide 20 assumes various polarized states and for this reason an optical receiver having polarization-independent optical demultiplexing characteristics can be realized by adopting the configuration as shown in FIG. 20.

EIGHTH EMBODIMENT

Figure 21:
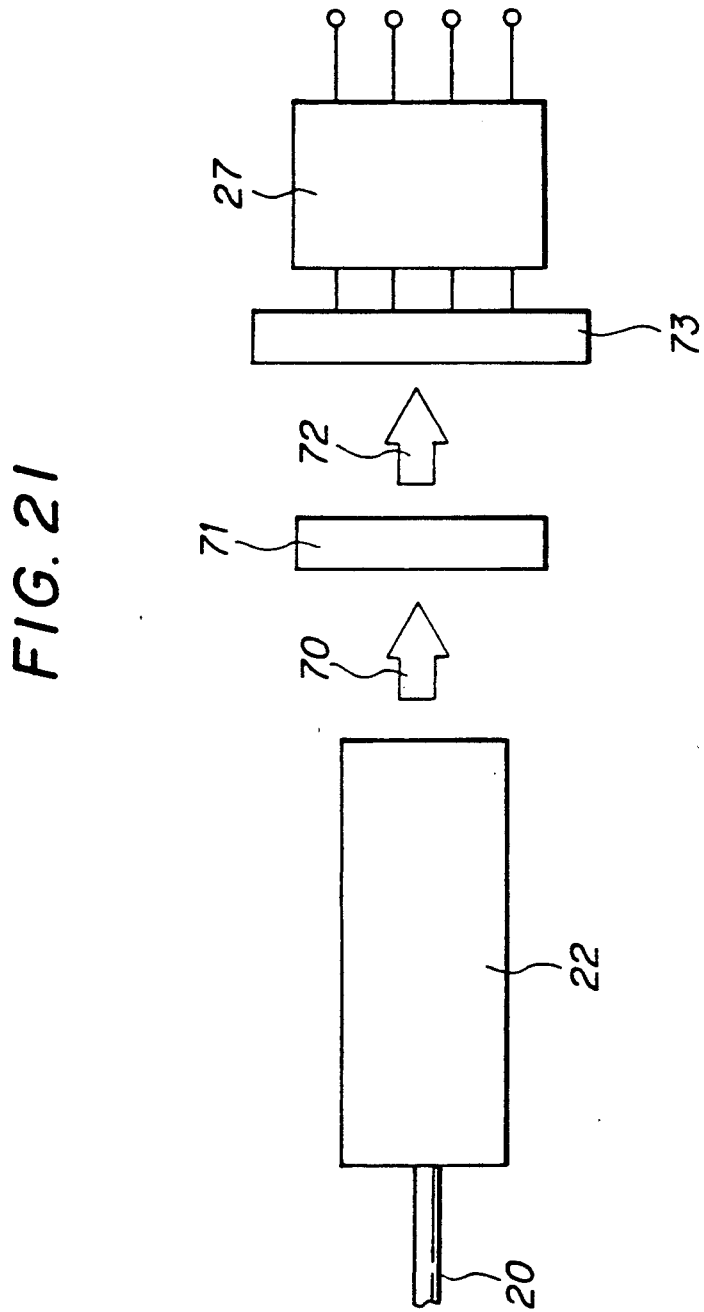
FIG. 21 is a plan view of the configuration of an optical receiver according to the eighth embodiment of the present invention.

FIG. 21 shows the eighth embodiment of the present invention. In this embodiment, the neural network 27 described in the first embodiment above is connected downstream of the photo-detector array 73. Utilizing the pattern recognition function which the neural network 27 has, this embodiment enables further improvement in its signal regeneration characteristics.

NINTH EMBODIMENT

Figure 22:
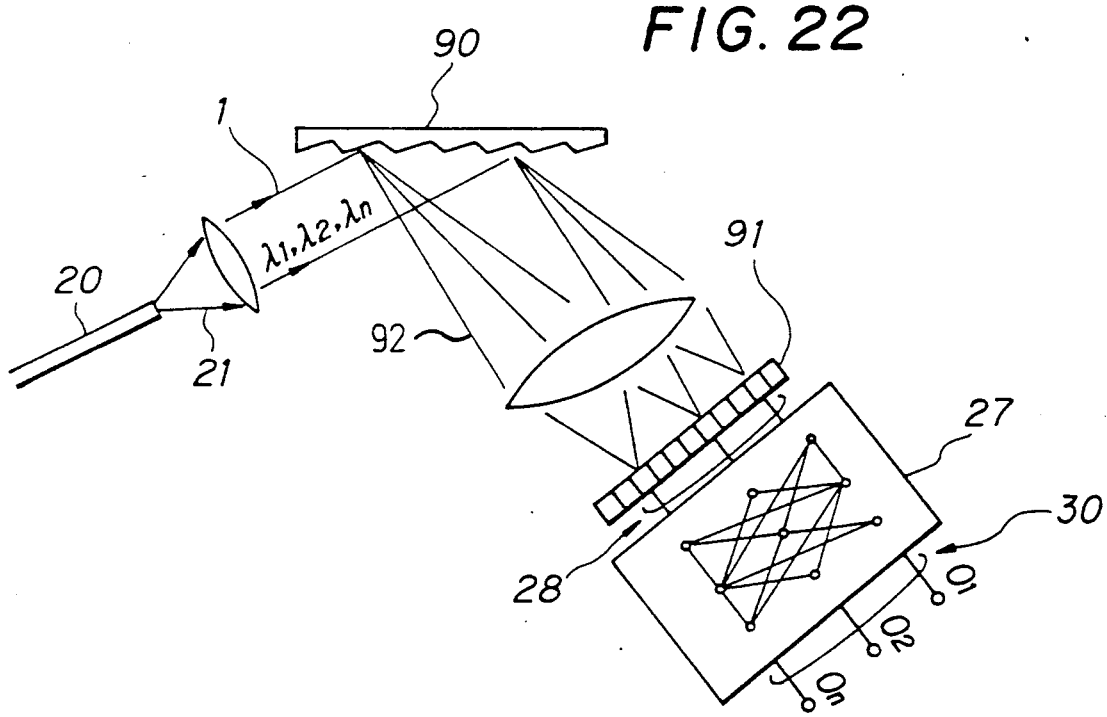

FIG. 22 shows the ninth embodiment of the present invention. In FIG. 22, reference numeral 90 indicates a diffraction grating, 91 designates a one-dimensional photodetector (PD) array arranged linearly with output ports 28, and 27 and 30 are a neural network output ports thereof as in the preceding embodiments.

A major difference between this embodiment and the other preceding embodiments is in the use of the optical conversion device 90.

Figure 23:
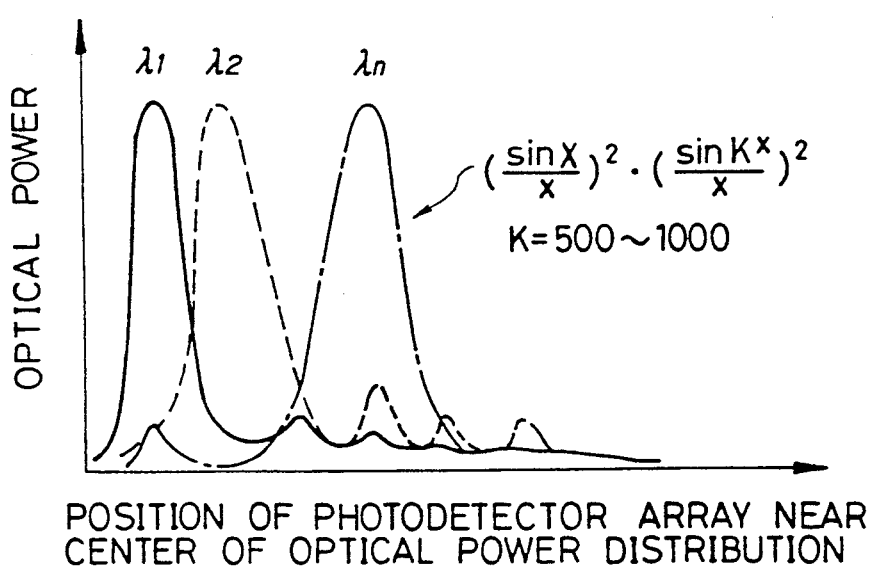
Figure 24:
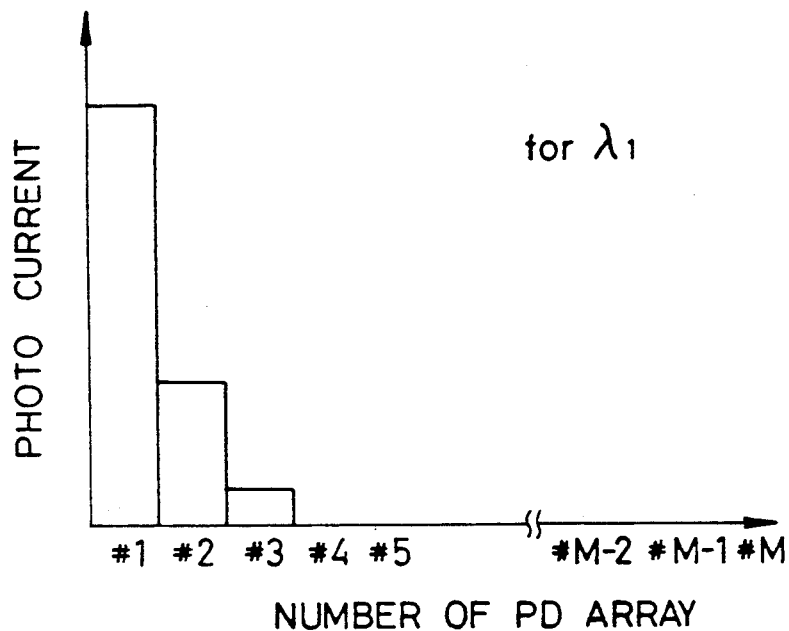
Figure 25:
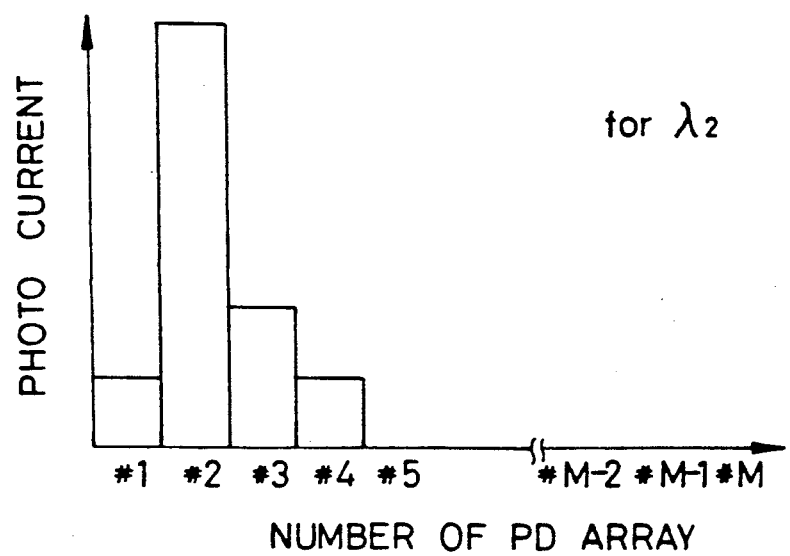
Figure 26:
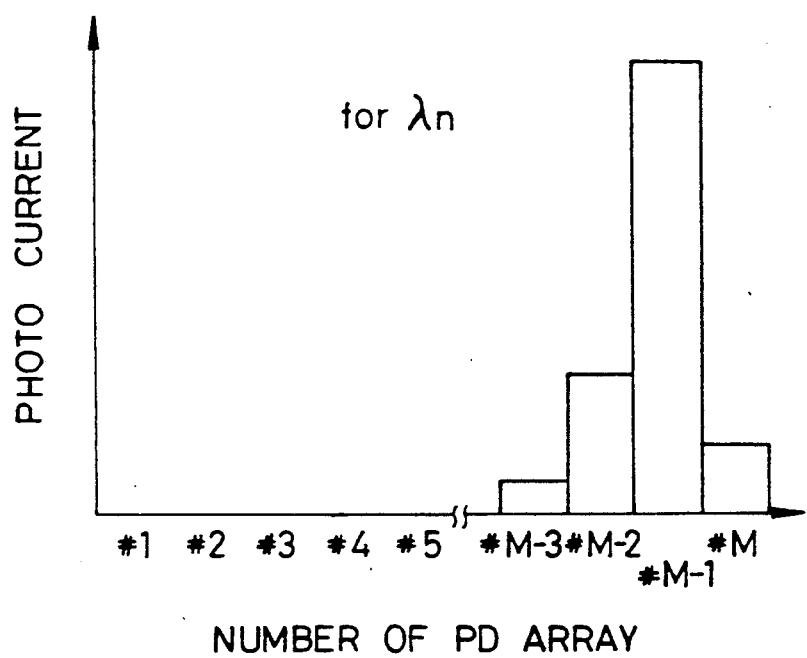

As shown in FIG. 22, the wavelength multiplexed signal light 21 is scattered angularly or diffracted by the diffraction grating 90 to form an angularly scattered signal light 92. Here, the wavelength multiplexed signal light 21 is a digital signal modified with respect to its intensity. On the photo-detector array the angularly scattered (diffracted) signal light 92 is converted into an optical power distribution having a single peak per wavelength as shown in FIG. 23. As will be apparent from FIG. 23, the optical power distribution varies continuously in the direction in which the array is arranged. However, since the photodetector has a limited size, the distribution of photoelectric current is represented by discontinuous or stepwise patterns as shown in FIGS. 24 through 26. When the plural signal light rays are in a state of "ON" simultaneously, the distribution of photoelectric current is a linear addition of the respective photoelectric currents thereof. Pattern recognition processing by the neural network 27 of such photoelectric current distribution outputted from the photo-detector array 91 results in the regeneration of signals corresponding to the respective wavelengths from the output ports 30 of the neural network 27.

As stated earlier, the internal conditions of the neural network 27 can be set up electrically so that it can generate specified output patterns in accordance with specified input patterns based on its function. For example, it can be set up such that a pattern $[1, 0, \ldots, 0]$ is outputted from the output ports 30 $[0_1, 0_2, \ldots, 0_n]$ in response to an input of electric current distribution as shown in FIG. 24. The number of patterns to be preset is $2^n$ when the number of wavelengths to be multiplexed is n assuming that binary signals are used. In this case, there occurs no deterioration of demultiplexing characteristics accompanied by a variation in wavelength since the neural network (NN) automatically alters the internal conditions thereof to adjust the demultiplexing wavelength even if a variation in wavelength occurs in the light source.

In FIGS. 24 through 26, the number of the photodetectors (M) and that of multiplexed wavelengths (n) must satisfy the following relationship: $n \leq M$.

As described above, in this embodiment, an optical connection with high precision is unnecessary since the optical receiver is designed so that the optical power distribution is received by the whole photo-detector array.

Although this embodiment uses a diffraction element as an angular scattering element, the same operation can be performed when a prism is replaced thereof.

What is claimed is:

1. An optical wavelength demultiplexer comprising:
   input means for receiving a plurality of light signals having different wavelengths;
   optical conversion means for converting the differences in the wavelengths of the received light signals into a difference in spatial power distribution of the received light signals, the light signals being received at an input terminal surface of said optical conversion means and propagating with respective propagation constants through the optical conversion means onto an output terminal surface of said optical conversion means where said spatial power distribution is output, said spatial power distrubution being in accordance with the difference between respective propagation constants which are dependent on the respective wavelengths of the received light signals; and
   pattern recognition means for recognizing patterns of said spatial power distribution and outputting signals indicative of the recognized spatial power distribution pattern.

2. An optical wavelength demultiplexer as claimed in claim 1, wherein said optical conversion means comprises an optical multimode circuit which enables simultaneous propagation of a plurality of modes of said received light signals, and wherein said optical conversion means is adapted to propagate optical signals with one or more wavelengths launched into said input terminal surface and to output respective spatial power distributions of said optical signals at said output terminal surface.

3. An optical wavelength demultiplexer as claimed in claim 2, wherein said optical multimode circuit is an optical multimode waveguide.

4. An optical wavelength demultiplexer as claimed in claim 2, wherein said optical multimode circuit comprises an optical multimode waveguide and a plurality of optical waveguides connected to an output side terminal surface of said optical multimode waveguide.

5. An optical wavelength demultiplexer as claimed in claim 2, wherein said optical multimode circuit is an optical circuit which comprises a combination of a plurality of optical waveguides, directional couplers, and Y-branch devices.

6. An optical wavelength demultiplexer as claimed in claim 1, wherein said optical conversion means is a diffraction grating.

7. An optical wavelength demultiplexer as claimed in claim 1, wherein said pattern recognition means comprises:
   (a) a photo-detector array which receives said spatial power distribution from said optical conversion means and converts said spatial power distribution into electric signals; and
   (b) a neural network comprising a plurality of processing elements and connection elements which processes said electric signals from said photodetector array and takes out output signals corresponding to optical signals having respective wavelengths contained in said light signals having one or more wavelengths which were received by said optical conversion means.

8. An optical wavelength demultiplexer as claimed in claim 7, wherein said neural network has variable parameters.

9. An optical wavelength demultiplexer as claimed in claim 2, wherein said pattern recognition means comprises:
   (a) a hologram element which receives said spatial power distribution outputted from said optical conversion means and processes said spatial power distributions according to wavefront conditions of said received light signals and outputs output light corresponding to optical signals with respective wavelengths contained in said light signals having one or more wavelengths which were received by said optical conversion means; and
   (b) a photo-detector array which receives said output light from said hologram element and converts said output light into electric signals.

10. An optical wavelength demultiplexer as claimed in claim 2, wherein said pattern recognition means comprises:
   (a) a hologram element which receives said spatial power distributions outputted from said optical conversion means and processes said spatial power distributions according to wavefront conditions of said received light signals and outputs output light corresponding to optical signals with respective wavelengths contained in said light signals having one or more wavelengths which were received by said optical conversion means;
   (b) a photo-detector array which receives said output light from said hologram element and converts said output light into electric signals; and
   (c) a neural network comprising a plurality of processing elements and connection element which processes said electric signals from said photodetector array and takes out output signals corresponding to optical signals having respective wavelengths contained in said light signals having one or more wavelengths which were received by said optical conversion means.

11. An optical wavelength demultiplexer as claimed in claim 10, wherein said neural network has variable internal parameters.

* * * * *